United States Patent
Gershony et al.

(10) Patent No.: US 11,502,975 B2
(45) Date of Patent: Nov. 15, 2022

(54) AUTOMATIC SUGGESTIONS AND OTHER CONTENT FOR MESSAGING APPLICATIONS

(71) Applicant: Google LLC, Mountain View, CA (US)

(72) Inventors: Ori Gershony, Redmond, WA (US);
Sergey Nazarov, Saratov (RU);
Rodrigo De Castro, Seattle, WA (US);
Erika Palmer, Kirkland, WA (US);
Daniel Ramage, Seattle, WA (US);
Adam Rodriguez, Singapore (SG);
Andrei Pascovici, Bellevue, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/999,702

(22) Filed: Aug. 21, 2020

(65) Prior Publication Data
US 2020/0382454 A1   Dec. 3, 2020

Related U.S. Application Data

(63) Continuation of application No. 15/386,760, filed on Dec. 21, 2016, now Pat. No. 10,757,043.
(Continued)

(51) Int. Cl.
*H04L 51/02* (2022.01)
*H04L 51/04* (2022.01)
(Continued)

(52) U.S. Cl.
CPC ........... *H04L 51/02* (2013.01); *H04L 51/04* (2013.01); *H04L 51/18* (2013.01); *H04L 51/216* (2022.05);
(Continued)

(58) Field of Classification Search
CPC ............................... H04L 51/02; H04L 51/16
See application file for complete search history.

(56) References Cited

U.S. PATENT DOCUMENTS

| | | | |
|---|---|---|---|
| 5,963,649 | A | 10/1999 | Sako |
| 6,092,102 | A | 7/2000 | Wagner |

(Continued)

FOREIGN PATENT DOCUMENTS

| | | |
|---|---|---|
| CA | 2828011 | 9/2012 |
| CN | 1475908 | 2/2004 |

(Continued)

OTHER PUBLICATIONS

JPO, Office Action for Japanese Patent Application No. 2019-518995, dated Jan. 19, 2021, 5 pages.
(Continued)

*Primary Examiner* — Hitesh Patel
(74) *Attorney, Agent, or Firm* — Shumaker & Sieffert, P.A.

(57) ABSTRACT

A messaging application may automatically analyze content of one or more messages and/or user information to automatically provide suggestions to a user within a messaging application. The suggestions may automatically incorporate particular non-messaging functionality into the messaging application. The automatic suggestions may suggest one or more appropriate responses to be selected by a user to respond in the messaging application, and/or may automatically send one or more appropriate responses on behalf of a user.

20 Claims, 16 Drawing Sheets

Related U.S. Application Data

(60) Provisional application No. 62/334,305, filed on May 10, 2016, provisional application No. 62/308,195, filed on Mar. 14, 2016, provisional application No. 62/270,454, filed on Dec. 21, 2015.

(51) Int. Cl.
  *H04L 51/216* (2022.01)
  *H04L 51/222* (2022.01)
  *H04L 51/18* (2022.01)
  *H04L 51/046* (2022.01)
  *H04L 51/063* (2022.01)

(52) U.S. Cl.
  CPC .......... *H04L 51/222* (2022.05); *H04L 51/046* (2013.01); *H04L 51/063* (2013.01)

(56) References Cited

U.S. PATENT DOCUMENTS

| | | |
|---|---|---|
| D599,363 S | 9/2009 | Mays |
| 7,603,413 B1 | 10/2009 | Herold et al. |
| D611,053 S | 3/2010 | Kanga et al. |
| D624,927 S | 10/2010 | Allen et al. |
| 7,904,187 B2 | 3/2011 | Hoffberg et al. |
| D648,343 S | 11/2011 | Chen |
| D648,735 S | 11/2011 | Arnold |
| D651,609 S | 1/2012 | Pearson et al. |
| D658,201 S | 4/2012 | Gleasman et al. |
| D658,677 S | 5/2012 | Gleasman et al. |
| D658,678 S | 5/2012 | Gleasman et al. |
| 8,266,109 B1 | 9/2012 | Bilsborough |
| D673,172 S | 12/2012 | Peters |
| 8,391,618 B1 | 3/2013 | Chuang et al. |
| 8,423,577 B1 | 4/2013 | Lee et al. |
| 8,515,958 B2 | 8/2013 | Knight |
| 8,554,701 B1 | 10/2013 | Dillard et al. |
| 8,589,407 B2 | 11/2013 | Bhatia |
| D695,755 S | 12/2013 | Hwang et al. |
| D716,338 S | 1/2014 | Lee |
| D699,739 S | 2/2014 | Voreis et al. |
| D699,744 S | 2/2014 | Ho Kushner |
| 8,645,697 B1 | 2/2014 | Emigh et al. |
| 8,650,210 B1 | 2/2014 | Cheng et al. |
| D701,228 S | 3/2014 | Lee |
| D701,527 S | 3/2014 | Brinda et al. |
| D701,528 S | 3/2014 | Brinda et al. |
| 8,688,698 B1 | 4/2014 | Black et al. |
| 8,700,480 B1 | 4/2014 | Fox et al. |
| D704,726 S | 5/2014 | Maxwell |
| D705,244 S | 5/2014 | Arnold et al. |
| D705,251 S | 5/2014 | Pearson et al. |
| D705,802 S | 5/2014 | Kerr et al. |
| D706,802 S | 6/2014 | Myung et al. |
| 8,825,474 B1 | 9/2014 | Zhai et al. |
| D714,821 S | 10/2014 | Chand et al. |
| 8,938,669 B1 | 1/2015 | Cohen |
| 8,996,639 B1 | 3/2015 | Faaborg et al. |
| 9,019,415 B2 | 4/2015 | Ma et al. |
| 9,020,956 B1 | 4/2015 | Barr et al. |
| 9,043,407 B1 | 5/2015 | Gaulke et al. |
| 9,191,786 B2 | 11/2015 | Davis |
| 9,213,941 B2 | 12/2015 | Petersen |
| 9,230,241 B1 | 1/2016 | Singh et al. |
| 9,262,517 B2 | 2/2016 | Feng et al. |
| 9,330,110 B2 | 5/2016 | Lin et al. |
| 9,467,435 B1 | 10/2016 | Tyler et al. |
| 9,560,152 B1 * | 1/2017 | Jamdar ................ H04L 67/306 |
| 9,595,059 B2 | 3/2017 | Knudson et al. |
| 9,600,724 B2 | 3/2017 | Ko et al. |
| 9,633,048 B1 | 4/2017 | Dutta et al. |
| 9,674,120 B2 | 6/2017 | Davis |
| 9,715,496 B1 | 7/2017 | Sapoznik et al. |
| 9,727,584 B2 | 8/2017 | Alldrin et al. |
| 9,805,371 B1 | 10/2017 | Sapoznik et al. |
| 9,807,037 B1 | 10/2017 | Sapoznik et al. |
| 9,817,813 B2 | 11/2017 | Faizakof et al. |
| 9,973,705 B2 | 5/2018 | Kinugawa et al. |
| 10,129,193 B2 | 11/2018 | Mahmoud et al. |
| 10,146,748 B1 | 12/2018 | Barndollar et al. |
| 10,146,768 B2 | 12/2018 | Fuxman et al. |
| 10,404,636 B2 | 9/2019 | Rodriguez et al. |
| 10,412,030 B2 | 9/2019 | McGregor et al. |
| 10,440,279 B2 | 10/2019 | Ko et al. |
| 10,547,574 B2 | 1/2020 | Pham |
| 10,979,373 B2 | 4/2021 | Pham |
| 11,201,890 B1 * | 12/2021 | Coull .................. H04L 63/1416 |
| 2002/0040297 A1 | 4/2002 | Tsiao et al. |
| 2002/0103837 A1 * | 8/2002 | Balchandran ......... G06F 40/253 |
| | | 715/264 |
| 2003/0105589 A1 | 6/2003 | Liu et al. |
| 2003/0182374 A1 | 9/2003 | Haldar |
| 2005/0146621 A1 | 7/2005 | Tanaka et al. |
| 2006/0004685 A1 | 1/2006 | Pyhalammi et al. |
| 2006/0021023 A1 | 1/2006 | Stewart et al. |
| 2006/0029106 A1 | 2/2006 | Ott et al. |
| 2006/0150119 A1 | 7/2006 | Chesnais et al. |
| 2006/0156209 A1 | 7/2006 | Matsuura et al. |
| 2006/0172749 A1 | 8/2006 | Sweeney |
| 2007/0030364 A1 | 2/2007 | Obrador et al. |
| 2007/0094217 A1 | 4/2007 | Ronnewinkel |
| 2007/0162942 A1 | 7/2007 | Hamynen et al. |
| 2007/0244980 A1 | 10/2007 | Baker et al. |
| 2008/0086522 A1 | 4/2008 | Biggs et al. |
| 2008/0114837 A1 | 5/2008 | Biggs et al. |
| 2008/0120371 A1 | 5/2008 | Gopal |
| 2008/0153526 A1 | 6/2008 | Othmer |
| 2008/0189367 A1 * | 8/2008 | Okumura ................ H04L 51/02 |
| | | 709/204 |
| 2009/0007019 A1 | 1/2009 | Kobayashi et al. |
| 2009/0076795 A1 | 3/2009 | Bangalore et al. |
| 2009/0119584 A1 | 5/2009 | Herbst |
| 2009/0282114 A1 | 11/2009 | Feng et al. |
| 2009/0327436 A1 | 12/2009 | Chen |
| 2010/0077029 A1 * | 3/2010 | Shook .................. H04L 12/1831 |
| | | 709/204 |
| 2010/0118115 A1 | 5/2010 | Takahashi et al. |
| 2010/0228590 A1 | 9/2010 | Muller et al. |
| 2010/0251158 A1 | 9/2010 | Geppert et al. |
| 2010/0260426 A1 | 10/2010 | Huang et al. |
| 2011/0074685 A1 | 3/2011 | Causey et al. |
| 2011/0098056 A1 | 4/2011 | Rhoads |
| 2011/0107223 A1 | 5/2011 | Tilton et al. |
| 2011/0145068 A1 | 6/2011 | King et al. |
| 2011/0164163 A1 | 7/2011 | Bilbrey et al. |
| 2011/0202836 A1 | 8/2011 | Badger et al. |
| 2011/0212717 A1 | 9/2011 | Rhoads et al. |
| 2011/0221912 A1 | 9/2011 | Yoshizawa |
| 2011/0230174 A1 | 9/2011 | Mandanapu et al. |
| 2011/0252108 A1 | 10/2011 | Morris et al. |
| 2011/0252207 A1 | 10/2011 | Janosik, Jr. et al. |
| 2012/0030289 A1 | 2/2012 | Buford et al. |
| 2012/0033876 A1 | 2/2012 | Momeyer et al. |
| 2012/0041941 A1 | 2/2012 | King et al. |
| 2012/0041973 A1 | 2/2012 | Kim et al. |
| 2012/0042036 A1 | 2/2012 | Lau et al. |
| 2012/0089847 A1 | 4/2012 | Tu et al. |
| 2012/0096097 A1 * | 4/2012 | Morinaga ............ G06Q 10/107 |
| | | 709/206 |
| 2012/0131520 A1 | 5/2012 | Tang et al. |
| 2012/0140124 A1 | 6/2012 | Moroney et al. |
| 2012/0179717 A1 | 7/2012 | Kennedy et al. |
| 2012/0224743 A1 | 9/2012 | Rodriguez et al. |
| 2012/0239761 A1 * | 9/2012 | Linner .................. G06F 40/279 |
| | | 709/206 |
| 2012/0245944 A1 | 9/2012 | Gruber et al. |
| 2012/0278164 A1 | 11/2012 | Spivack et al. |
| 2012/0322428 A1 | 12/2012 | Lupoli et al. |
| 2013/0021266 A1 | 1/2013 | Selim |
| 2013/0036162 A1 | 2/2013 | Koenigs |
| 2013/0050507 A1 | 2/2013 | Syed et al. |
| 2013/0061148 A1 | 3/2013 | Das et al. |
| 2013/0073366 A1 | 3/2013 | Heath |
| 2013/0218877 A1 | 8/2013 | Satyanarayanan |

(56) References Cited

U.S. PATENT DOCUMENTS

| | | |
|---|---|---|
| 2013/0260727 A1 | 10/2013 | Knudson et al. |
| 2013/0262574 A1 | 10/2013 | Cohen |
| 2013/0346235 A1 | 12/2013 | Lam |
| 2014/0004889 A1 | 1/2014 | Davis |
| 2014/0012927 A1* | 1/2014 | Gertzfield ............ G06F 16/252 709/206 |
| 2014/0035846 A1 | 2/2014 | Lee et al. |
| 2014/0047413 A1 | 2/2014 | Sheive et al. |
| 2014/0067371 A1 | 3/2014 | Liensberger |
| 2014/0071324 A1 | 3/2014 | Tokunaga et al. |
| 2014/0088954 A1 | 3/2014 | Shirzadi et al. |
| 2014/0108562 A1 | 4/2014 | Panzer |
| 2014/0129942 A1 | 5/2014 | Rathod |
| 2014/0150068 A1 | 5/2014 | Janzer |
| 2014/0156801 A1 | 6/2014 | Fernandes et al. |
| 2014/0163954 A1 | 6/2014 | Joshi et al. |
| 2014/0164506 A1 | 6/2014 | Tesch et al. |
| 2014/0171133 A1 | 6/2014 | Stuttle et al. |
| 2014/0189027 A1 | 7/2014 | Zhang et al. |
| 2014/0189538 A1 | 7/2014 | Martens et al. |
| 2014/0195621 A1* | 7/2014 | Rao DV ............ H04L 12/1827 709/206 |
| 2014/0201675 A1 | 7/2014 | Joo et al. |
| 2014/0228009 A1 | 8/2014 | Chen et al. |
| 2014/0232889 A1 | 8/2014 | King et al. |
| 2014/0237057 A1 | 8/2014 | Khodorenko |
| 2014/0298364 A1 | 10/2014 | Stepanov et al. |
| 2014/0317030 A1 | 10/2014 | Shen et al. |
| 2014/0337438 A1 | 11/2014 | Govande et al. |
| 2014/0344058 A1 | 11/2014 | Brown |
| 2014/0372349 A1 | 12/2014 | Driscoll |
| 2014/0372540 A1 | 12/2014 | Libin |
| 2015/0006143 A1 | 1/2015 | Skiba et al. |
| 2015/0026101 A1 | 1/2015 | Lin et al. |
| 2015/0026642 A1 | 1/2015 | Wilson et al. |
| 2015/0032724 A1* | 1/2015 | Thirugnanasundaram ................... H04L 51/32 707/722 |
| 2015/0058720 A1 | 2/2015 | Smadja et al. |
| 2015/0088998 A1* | 3/2015 | Isensee ................ G06F 40/279 709/206 |
| 2015/0095855 A1 | 4/2015 | Bai et al. |
| 2015/0100537 A1 | 4/2015 | Grieves et al. |
| 2015/0127453 A1 | 5/2015 | Tew et al. |
| 2015/0171133 A1 | 6/2015 | Kim et al. |
| 2015/0178371 A1 | 6/2015 | Seth et al. |
| 2015/0178388 A1* | 6/2015 | Winnemoeller .... H04L 12/1827 707/722 |
| 2015/0185995 A1 | 7/2015 | Showmaker et al. |
| 2015/0207765 A1 | 7/2015 | Brantingham et al. |
| 2015/0220806 A1 | 8/2015 | Heller et al. |
| 2015/0222617 A1 | 8/2015 | Ebersman et al. |
| 2015/0227797 A1 | 8/2015 | Ko et al. |
| 2015/0244653 A1* | 8/2015 | Niu ........................ H04L 51/02 715/752 |
| 2015/0248411 A1 | 9/2015 | Krinker et al. |
| 2015/0250936 A1 | 9/2015 | Thomas et al. |
| 2015/0286371 A1 | 10/2015 | Degani |
| 2015/0288633 A1 | 10/2015 | Ogundokun et al. |
| 2015/0302301 A1 | 10/2015 | Petersen |
| 2015/0347617 A1 | 12/2015 | Weinig et al. |
| 2015/0347769 A1 | 12/2015 | Espinosa et al. |
| 2015/0350117 A1* | 12/2015 | Bastide ................ H04L 51/02 715/752 |
| 2015/0370830 A1 | 12/2015 | Murphy-Chutorian et al. |
| 2016/0011725 A1 | 1/2016 | D'Argenio et al. |
| 2016/0037311 A1 | 2/2016 | Cho |
| 2016/0042252 A1 | 2/2016 | Sawhney et al. |
| 2016/0043817 A1 | 2/2016 | Handoush et al. |
| 2016/0043974 A1 | 2/2016 | Purcell et al. |
| 2016/0055246 A1 | 2/2016 | Marcin et al. |
| 2016/0065519 A1* | 3/2016 | Waltermann ............ H04L 67/10 709/206 |
| 2016/0072737 A1 | 3/2016 | Forster |
| 2016/0092044 A1 | 3/2016 | Laska et al. |
| 2016/0140447 A1 | 5/2016 | Cohen et al. |
| 2016/0140477 A1 | 5/2016 | Karanam et al. |
| 2016/0162791 A1 | 6/2016 | Petersen |
| 2016/0179816 A1 | 6/2016 | Glover |
| 2016/0196040 A1 | 7/2016 | Kapadia et al. |
| 2016/0210279 A1 | 7/2016 | Kim et al. |
| 2016/0210962 A1 | 7/2016 | Kim et al. |
| 2016/0224524 A1 | 8/2016 | Kay et al. |
| 2016/0226804 A1 | 8/2016 | Hampson et al. |
| 2016/0234553 A1 | 8/2016 | Hampson et al. |
| 2016/0283454 A1 | 9/2016 | Leydon et al. |
| 2016/0284011 A1 | 9/2016 | Dong et al. |
| 2016/0292217 A1 | 10/2016 | Sinha et al. |
| 2016/0308794 A1* | 10/2016 | Kim ...................... H04M 19/04 |
| 2016/0321052 A1 | 11/2016 | Sharifi et al. |
| 2016/0342895 A1 | 11/2016 | Gao et al. |
| 2016/0350304 A1 | 12/2016 | Aggarwal et al. |
| 2016/0352656 A1* | 12/2016 | Galley ................. G06N 3/0454 |
| 2016/0378080 A1 | 12/2016 | Uppala et al. |
| 2017/0004383 A1 | 1/2017 | Lin et al. |
| 2017/0017648 A1 | 1/2017 | Pearlman et al. |
| 2017/0031575 A1 | 2/2017 | Dotan-Cohen et al. |
| 2017/0075878 A1 | 3/2017 | Jon et al. |
| 2017/0093769 A1 | 3/2017 | Lind et al. |
| 2017/0098122 A1 | 4/2017 | el Kaliouby et al. |
| 2017/0098152 A1 | 4/2017 | Kerr et al. |
| 2017/0118152 A1* | 4/2017 | Lee ........................ G06F 3/0485 |
| 2017/0134316 A1 | 5/2017 | Cohen et al. |
| 2017/0142046 A1 | 5/2017 | Mahmoud et al. |
| 2017/0147202 A1 | 5/2017 | Donohue |
| 2017/0149703 A1 | 5/2017 | Willett et al. |
| 2017/0153792 A1 | 6/2017 | Kapoor et al. |
| 2017/0171117 A1 | 6/2017 | Carr et al. |
| 2017/0180276 A1 | 6/2017 | Gershony et al. |
| 2017/0180294 A1 | 6/2017 | Milligan et al. |
| 2017/0185236 A1 | 6/2017 | Yang et al. |
| 2017/0187654 A1 | 6/2017 | Lee |
| 2017/0250930 A1 | 8/2017 | Ben-Itzhak |
| 2017/0250935 A1* | 8/2017 | Rosenberg ............. H04L 51/02 |
| 2017/0250936 A1 | 8/2017 | Rosenberg et al. |
| 2017/0277701 A1 | 9/2017 | Maharajh et al. |
| 2017/0288942 A1 | 10/2017 | Plumb et al. |
| 2017/0293834 A1 | 10/2017 | Raison et al. |
| 2017/0308249 A1 | 10/2017 | Petterson et al. |
| 2017/0308589 A1 | 10/2017 | Liu et al. |
| 2017/0324868 A1 | 11/2017 | Tamblyn et al. |
| 2017/0339076 A1* | 11/2017 | Patil ........................ H04L 51/02 |
| 2017/0344224 A1 | 11/2017 | Kay et al. |
| 2017/0357432 A1 | 12/2017 | King et al. |
| 2017/0357442 A1 | 12/2017 | Peterson et al. |
| 2017/0359279 A1 | 12/2017 | Peterson et al. |
| 2017/0359281 A1 | 12/2017 | Yip et al. |
| 2017/0359282 A1 | 12/2017 | Alsina et al. |
| 2017/0359283 A1 | 12/2017 | Bernstein |
| 2017/0359285 A1 | 12/2017 | Weinig et al. |
| 2017/0359701 A1 | 12/2017 | Sarma et al. |
| 2017/0359702 A1 | 12/2017 | Peterson et al. |
| 2017/0359703 A1 | 12/2017 | Ciechanowski et al. |
| 2017/0366479 A1 | 12/2017 | Ladha et al. |
| 2018/0004397 A1 | 1/2018 | Mazzocchi |
| 2018/0005272 A1 | 1/2018 | Todasco et al. |
| 2018/0005288 A1 | 1/2018 | Delaney |
| 2018/0012231 A1 | 1/2018 | Sapoznik et al. |
| 2018/0013699 A1 | 1/2018 | Sapoznik et al. |
| 2018/0032499 A1 | 2/2018 | Hampson et al. |
| 2018/0032997 A1 | 2/2018 | Gordon et al. |
| 2018/0060705 A1 | 3/2018 | Mahmoud et al. |
| 2018/0083894 A1 | 3/2018 | Fung et al. |
| 2018/0083898 A1 | 3/2018 | Pham |
| 2018/0083901 A1 | 3/2018 | McGregor et al. |
| 2018/0089230 A1 | 3/2018 | Qi |
| 2018/0090135 A1 | 3/2018 | Schlesinger et al. |
| 2018/0109526 A1 | 4/2018 | Fung et al. |
| 2018/0137097 A1 | 5/2018 | Lim et al. |
| 2018/0196854 A1 | 7/2018 | Burks |
| 2018/0210874 A1 | 7/2018 | Fuxman et al. |
| 2018/0227498 A1 | 8/2018 | Ko et al. |
| 2018/0293601 A1 | 10/2018 | Glazier |

(56) References Cited

U.S. PATENT DOCUMENTS

| | | |
|---|---|---|
| 2018/0295081 A1 | 10/2018 | McGregor et al. |
| 2018/0309706 A1 | 10/2018 | Kim et al. |
| 2018/0316637 A1 | 11/2018 | Desjardins |
| 2018/0322403 A1 | 11/2018 | Ron et al. |
| 2018/0336226 A1 | 11/2018 | Anorga et al. |
| 2018/0336415 A1 | 11/2018 | Anorga et al. |
| 2018/0352393 A1 | 12/2018 | Lottermoser et al. |
| 2018/0367483 A1 | 12/2018 | Rodriguez et al. |
| 2018/0367484 A1 | 12/2018 | Rodriguez et al. |
| 2018/0373683 A1 | 12/2018 | Hullette et al. |
| 2019/0204868 A1 | 7/2019 | Choi et al. |
| 2020/0106726 A1 | 4/2020 | Pham |
| 2021/0243143 A1 | 8/2021 | Pham |

FOREIGN PATENT DOCUMENTS

| | | |
|---|---|---|
| CN | 1988461 | 6/2007 |
| CN | 1989497 | 6/2007 |
| CN | 101159576 | 4/2008 |
| CN | 101983396 | 3/2011 |
| CN | 102158431 | 8/2011 |
| CN | 102222079 | 10/2011 |
| CN | 102395966 | 3/2012 |
| CN | 102467574 | 5/2012 |
| CN | 102667754 | 9/2012 |
| CN | 103226949 | 7/2013 |
| CN | 103493035 | 1/2014 |
| CN | 103548025 | 1/2014 |
| CN | 103841007 | 6/2014 |
| CN | 103995872 | 8/2014 |
| CN | 104035947 | 9/2014 |
| CN | 104202718 | 12/2014 |
| CN | 104836720 | 8/2015 |
| CN | 104951428 | 9/2015 |
| CN | 105068661 | 11/2015 |
| CN | 105141503 | 12/2015 |
| CN | 105262675 | 1/2016 |
| CN | 105306281 | 2/2016 |
| CN | 105683874 | 6/2016 |
| CN | 105786455 | 7/2016 |
| CN | 105814519 | 7/2016 |
| CN | 105830104 | 8/2016 |
| CN | 105898627 | 8/2016 |
| CN | 105940397 | 9/2016 |
| EP | 1376392 | 1/2004 |
| EP | 1394713 | 3/2004 |
| EP | 2523436 | 11/2012 |
| EP | 2560104 | 2/2013 |
| EP | 2688014 | 1/2014 |
| EP | 2703980 | 3/2014 |
| EP | 2852105 | 3/2015 |
| EP | 3091445 | 11/2016 |
| IN | 201621015181 | 5/2016 |
| JP | 2000-298676 | 10/2000 |
| JP | 2002-132804 | 5/2002 |
| JP | 2010-44495 | 2/2010 |
| JP | 2012-027950 | 2/2012 |
| JP | 2012-221480 | 11/2012 |
| JP | 2014-86088 | 5/2014 |
| JP | 2014-142919 | 8/2014 |
| JP | 2014-170397 | 9/2014 |
| JP | 2015-531136 | 10/2015 |
| KR | 20110003462 | 1/2011 |
| KR | 20130008036 | 1/2013 |
| KR | 10-2013-0050871 | 5/2013 |
| KR | 20130061387 | 6/2013 |
| KR | 20140093949 | 7/2014 |
| KR | 1020150037935 | 4/2015 |
| KR | 10-2015-0108096 | 9/2015 |
| KR | 10-2017-0032883 | 3/2017 |
| WO | 2004/104758 | 12/2004 |
| WO | 2008/045811 | 4/2008 |
| WO | 2011/002989 | 1/2011 |
| WO | 2012/173681 | 12/2012 |
| WO | 2015/183493 | 12/2015 |
| WO | 2016/072117 | 5/2016 |
| WO | 2016/130788 | 8/2016 |
| WO | 2016130788 | 8/2016 |
| WO | 2016/204428 | 12/2016 |
| WO | 2018089109 | 5/2018 |

OTHER PUBLICATIONS

CNIPA, Second Office Action (with English translation) for Chinese Patent Application No. 201680082643.2, dated Apr. 2, 2021, 13 pages.

EPO, Communication Pursuant to Article 94(3) EPC for European Patent Application No. 17780938.1, dated May 18, 2021, 7 pages.

EPO, Summons to Attend Oral Proceedings for European Patent Application No. 17794825.4, Feb. 12, 2021, 10 pages.

EPO, Communication Pursuant to Article 94(3) EPC for European Patent Application No. 18716400.9, dated Mar. 11, 2021, 9 pages.

IPO, First Examination Report for Indian Patent Application No. 201847024288, dated Jan. 22, 2021, 7 pages.

IPO, First Examination Report for Indian Patent Application No. 201947015830, dated Mar. 17, 2021, 6 pages.

IPO, First Examination Report for Indian Patent Application No. 201947014236, dated Mar. 29, 2021, 7 pages.

Mathur, "How Google Allo stands out from WhatsApp, WeChat, Facebook Messenger", Retrieved from Internet: https://www.livemint.com/Leisure/6BcwmziLgEueyaL8VIgvHP/GoogleAllo-Machine-learning-smart-features-could-stumble-o.html, Sep. 21, 2016, 8 pages.

USPTO, Notice of Allowance for U.S. Appl. No. 16/881,816, dated Feb. 4, 2021, 15 pages.

USPTO, Notice of Allowance for U.S. Appl. No. 16/436,632, dated Mar. 3, 2021, 7 pages.

JPO, Notice of Allowance (with English translation) for Japanese Patent Application No. 2018-532399, dated Sep. 23, 2020, 2 pages.

USPTO, Notice of Allowance for U.S. Appl. No. 15/912,809, dated Sep. 11, 2020, 12 pages.

Notice of Acceptance for Australian Patent Application No. 2015214298, dated Apr. 20, 2018, 3 pages.

Examination Report No. 1 for Australian Patent Application No. 2015214298, dated Apr. 24, 2017, 3 pages.

Examination Report No. 2 for Australian Patent Application No. 2015214298, dated Nov. 2, 2017, 3 pages.

WIPO, International Search Report and Written Opinion for International Patent Application No. PCT/US2015/014414, dated May 11, 2015, 8 pages.

Blippar, "Computer Vision API", www.web.blippar.com/computer-vision-api, 4 pages.

Chen, et al., "A Survey of Document Image Classification: problem statement, classifier architecture and performance evaluation", International Journal of Document Analysis and Recognition (IJDAR), vol. 10, No. 1, Aug. 3, 2006, pp. 1-16.

Chen, et al., "Bezel Copy: An Efficient Cross-0Application Copy-Paste Technique for Touchscreen Smartphones.", Advanced Visual Interfaces, ACM, New York, New York, May 27, 2014, pp. 185-192.

CNIPA, First Office Action (with English translation) for Chinese Patent Application No. 201680082643.2, dated Aug. 5, 2020, 24 pages.

CNIPA, First Office Action for Chinese Patent Application No. 201580016692.1, dated Nov. 2, 2018, 7 pages.

CNIPA, First Office Action for Chinese Patent Application No. 201680070359.3, dated Jun. 3, 2020, 9 pages.

WIPO, International Search Report and Written Opinion for PCT Application No. PCT/US2017/046858, dated Oct. 11, 2017, 10 Pages.

WIPO, Written Opinion of the International Preliminary Examining Authority for International Patent Application No. PCT/US2018/021028, dated Jun. 14, 2019, 11 pages.

WIPO, International Search Report and Written Opinion for International Patent Application No. PCT/US2016/068083, dated Mar. 9, 2017, 13 pages.

WIPO, International Search Report for International Patent Application No. PCT/US2017/052713, dated Dec. 5, 2017, 4 Pages.

(56) References Cited

OTHER PUBLICATIONS

WIPO, International Search Report for International Patent Application No. PCT/US2016/068083, dated Mar. 9, 2017, 4 pages.
WIPO, International Search Report for International Patent Application No. PCT/US2018/022501, dated May 14, 2018, 4 pages.
EPO, Communication Pursuant to Article 94(3) EPC for European Patent Application No. 16825663.4, dated Apr. 16, 2019, 5 pages.
WIPO, International Search Report for International Patent Application No. PCT/US2017/052349, dated Dec. 13, 2017, 5 pages.
WIPO, International Search Report for International Patent Application No. PCT/US2017/057044, dated Jan. 18, 2018, 5 pages.
EPO, Communication Pursuant to Article 94(3) EPC for European Patent Application No. 16825663.4, dated May 7, 2020, 5 pages.
WIPO, Written Opinion for International Patent Application No. PCT/US2017/052713, Dec. 5, 2017, dated 6 Pages.
EPO, Communication Pursuant to Article 94(3) EPC for European Patent Application No. 16825666.7, dated Apr. 23, 2019, 6 pages.
WIPO, International Search Report for International Patent Application No. PCT/US2018/022503, dated Aug. 16, 2018, 6 pages.
WIPO, Written Opinion for International Patent Application No. PCT/US2017/052349, dated Dec. 13, 2017, 6 pages.
EPO, Communication Pursuant to Article 94(3) EPC for European Patent Application No. 18716399.3, dated Jul. 3, 2020, 6 pages.
EPO, Communication Pursuant to Article 94(3) EPC for European Patent Application No. 16825666.7, dated Jun. 18, 2020, 6 pages.
WIPO, Written Opinion for International Patent Application No. PCT/US2018/022501, dated May 14, 2018, 6 pages.
WIPO, Written Opinion of the International Preliminary Examining Authority for International Patent Application No. PCT/US2017/052713, dated Oct. 15, 2018, 6 pages.
EPO, Extended European Search Report for European Patent Application No. 15746410.8, dated Sep. 5, 2017, 7 pages.
WIPO, Written Opinion for International Patent Application No. PCT/US2018/022503, dated Aug. 16, 2018, 8 pages.
EPO, Communication Pursuant to Article 94(3) EPC for European Patent Application No. 17794825.4, dated Aug. 4, 2020, 8 pages.
WIPO, Written Opinion of the International Preliminary Examination Authority for International Patent Application No. PCT/US2017/057044, dated Dec. 20, 2018, 8 pages.
WIPO, Written Opinion for International Patent Application No. PCT/US2017/057044, dated Jan. 18, 2018, 8 pages.
WIPO, Written Opinion of the International Preliminary Examining Authority for International Patent Application No. PGT/US2017/052349, dated Aug. 6, 2018, 9 pages.
WIPO, Written Opinion for International Patent Application No. PCT/US2016/068083, dated Mar. 9, 2017, 9 pages.
Fuxman, Ariel, "Aw, so cute!": Allo helps you respond to shared photos, Google Research Blog, https://research.googleblog.com/2016/05/aw-so-cute-allo-helps-you-respond-to.html, May 18, 2016, 6 pages.
WIPO, International Preliminary Report on Patentability for International Patent Application No. PCT/US2018/021028, dated Nov. 28, 2019, 10 pages.
WIPO, International Preliminary Report on Patentability for International Patent Application No. PCT/US2018/022501, dated Dec. 17, 2019, 7 pages.
WIPO, International Preliminary Report on Patentability for International Patent Application No. PCT/US2017/046858, dated Feb. 19, 2019, 7 pages.
WIPO, International Preliminary Report on Patentability for International Patent Application No. PCT/US2017/052349, dated Mar. 26, 2019, 7 pages.
WIPO, International Preliminary Report on Patentability for International Patent Application No. PCT/US2018/022503, dated Dec. 17, 2019, 9 pages.
WIPO, International Preliminary Report on Patentability for International Patent Application No. PCT/US2017/057044, dated Jul. 30, 2019, 9 pages.
WIPO, International Preliminary Report on Patentability for International Patent Application No. PCT/US2016/068083, dated Jul. 5, 2018, 9 pages.
IPO, First Examination Report for Indian Patent Application No. 201847014172, dated Jun. 17, 2020, 7 pages.
JPO, Notice of Allowance (with English translation) for Japanese Patent Application No. 2018-551908, dated Dec. 3, 2019, 2 pages.
JPO, Notice of Allowance (with English translation) for Japanese Patent Application No. 2019-505058, dated Jan. 21, 2020, 2 pages.
JPO, Notice of Allowance (including English translation) for Japanese Patent Application No. 2019-547462, dated May 28, 2020, 2 pages.
JPO, Notice of Allowance (with English translation) for Japanese Patent Application No. 2019-520680, dated Nov. 12, 2019, 2 pages.
JPO, Office Action for Japanese Patent Application No. 2018-532399, dated Jun. 16, 2020, 3 pages.
JPO, Office Action for Japanese Patent Application No. 2018-551908, dated Aug. 20, 2019, 4 pages.
JPO, Office Action for Japanese Patent Application No. 2018-532399, dated Mar. 10, 2020, 4 pages.
JPO, Office Action for Japanese Patent Application No. 2019-518995, dated Jul. 28, 2020, 5 pages.
JPO, Office Action for Japanese Patent Application No. 2019-547462, dated Feb. 18, 2020, 6 pages.
JPO, Office Action for Japanese Patent Application No. 2018-532399, dated Jul. 23, 2019, 6 pages.
Kannan, et al., "Smart Reply: Automated Response Suggestions for Email", Proceedings of the 22nd ACM SIGKDD International Conference on Knowledge Discovery and Data Mining, KDD '16, ACM Press, New York, New York, Aug. 13, 2016, pp. 955-965.
Kannan, Anjuli et al., "Smart reply: Automated response suggestion for email", Proceedings of the 22nd ACM SIGKDD International Conference on Knowledge Discovery and Data Mining, Aug. 13, 2016, 10 pages.
Khandelwal, "Hey Allo! Meet Google's AI-powered Smart Messaging App", The Hacker News, http://web.archive.org/web/20160522155700/https://thehackernews.com/2016/05/google-allo-messenger.html, May 19, 2016, 3 pages.
KIPO, Notice of Preliminary Rejection for Korean Patent Application No. 10-2019-7011687, dated May 7, 2019, 3 pages.
KIPO, Notice of Final Rejection for Korean Patent Application No. 10-2018-7019756, dated Nov. 25, 2019, 3 pages.
KIPO, Notice of Allowance (with English translation) for Korean Patent Application No. 10-2019-7024479, dated Jan. 17, 2020, 4 pages.
KIPO, Notice of Final Rejection for Korean Patent Application No. 10-2018-7019756, dated Jan. 17, 2020, 4 pages.
KIPO, Notice of Final Rejection for Korean Patent Application No. 10-2018-7013953, dated Jun. 13, 2019, 4 pages.
KIPO, Notice of Final Rejection for Korean Patent Application No. 10-2019-7020465, dated Jun. 29, 2020, 4 pages.
KIPO, Notice of Final Rejection for Korean Patent Application No. 10-2018-7013953, dated May 8, 2019, 4 pages.
KIPO, Notice of Allowance for Korean Patent Application No. 10-2019-7011687, dated Sep. 26, 2019, 4 pages.
KIPO, Notice of Allowance (with English translation) for Korean Patent Application No. 10-2019-7020465, dated Aug. 5, 2020, 5 pages.
KIPO, Preliminary Rejection for Korean Patent Application No. 10-2018-7013953, dated Oct. 29, 2018, 5 pages.
KIPO, Notice of Preliminary Rejection (with English translation) for Korean Patent Application No. 10-2019-7020465, dated Jan. 10, 2020, 9 pages.
KIPO, Notice of Preliminary Rejection for Korean Patent Application No. 10-2018-7019756, dated May 13, 2019, 9 pages.
KIPO, Notice of Preliminary Rejection for Korean Patent Application No. 10-2019-7024479, dated Sep. 18, 2019, 9 pages.
Lardinois, F. "Allo brings Google's smarts to messaging", https://techcrunch.com/2016/09/20/allo-brings-googles-smarts-to-messaging/, Sep. 2016, 14 pages.
Lee, Jang Ho et al., "Supporting multi-user, multi-applet workspaces in CBE", Proceedings of the 1996 ACM conference on Computer supported cooperative work, ACM, Nov. 16, 1996, 10 pages.

(56) References Cited

OTHER PUBLICATIONS

Microsoft Corporation, "Windows Messenger for Windows XP", Retrieved from Internet: http://web.archive.org/web/20030606220012/messenger.msn.com/support/features.asp?client=0 on Sep. 22, 2005, Jun. 6, 2003, 3 pages.
WIPO, International Search Report and Written Opinion for International Application No. PCT/US2018/021028, dated Jun. 15, 2018, 11 Pages.
Pieterse, et al., "Android botnets on the rise: trends and characteristics", 2012 Information Security for South Africa, Aug. 15-17, 2012, 5 pages.
Pinterest, "Pinterest Lens", www.help.pinterest.com/en/articles/pinterest-lens, 2 pages.
Russell, "Google Allo is the Hangouts Killer We've Been Waiting for", Retrieved from the Internet: http://web.archive.org/web/20160519115534/https://www.technobuffalo.com/2016/05/18/google-allo-hangouts-replacement/, May 18, 2016, 3 pages.
USPTO, Notice of Allowance for U.S. Appl. No. 16/552,902, dated Aug. 27, 2020, 10 pages.
USPTO, Notice of Allowance for U.S. Appl. No. 16/560,815, dated Aug. 31, 2020, 11 pages.
USPTO, Notice of Allowance for U.S. Appl. No. 15/709,418, dated Mar. 1, 2018, 11 pages.
USPTO, Notice of Allowance for U.S. Appl. No. 16/003,661, dated May 1, 2019, 11 pages.
USPTO, Non-final Office Action for U.S. Appl. No. 15/386,162, dated Nov. 27, 2018, 11 Pages.
USPTO, Final Office Action for U.S. Appl. No. 15/386,760, dated Jan. 10, 2020, 12 pages.
USPTO, Non-final Office Action for U.S. Appl. No. 15/386,162, dated Nov. 27, 2018, 12 pages.
USPTO, Non-final Office Action for U.S. Appl. No. 15/386,760, dated Oct. 11, 2019, 12 pages.
USPTO, Final Office Action for U.S. Appl. No. 15/386,162, dated Jun. 5, 2019, 13 pages.
USPTO, Final Office Action for U.S. Appl. No. 15/386,760, dated May 30, 2019, 13 pages.
USPTO, Final Office Action for U.S. Appl. No. 15/238,304, dated Nov. 23, 2018, 14 pages.
USPTO, Notice of Allowance for U.S. Appl. No. 14/618,962, dated Nov. 8, 2016, 14 pages.
USPTO, Non-final Office Action for U.S. Appl. No. 15/709,418, dated Nov. 21, 2017, 15 pages.
USPTO, Notice of Allowance for U.S. Appl. No. 15/350,040, dated Apr. 24, 2019, 16 pages.
USPTO, First Action Interview, Office Action Summary for U.S. Appl. No. 16/003,661, dated Dec. 14, 2018, 16 pages.
USPTO, Non-final Office Action for U.S. Appl. No. 16/560,815, dated May 18, 2020, 16 pages.
USPTO, Notice of Allowance for U.S. Appl. No. 16/569,273, dated Feb. 20, 2020, 17 pages.
USPTO, Non-final Office Action for U.S. Appl. No. 15/238,304, dated Jun. 7, 2018, 17 pages.
USPTO, First Action Interview, Office Action Summary for U.S. Appl. No. 15/912,809, dated Feb. 18, 2020, 18 pages.
USPTO, Notice of Allowance for U.S. Appl. No. 15/709,423, dated Oct. 9, 2019, 19 pages.
USPTO, Notice of Allowance for U.S. Appl. No. 15/428,821, dated Jan. 10, 2018, 20 pages.
USPTO, Notice of Allowance for U.S. Appl. No. 15/709,440, dated Aug. 6, 2019, 21 pages.
USPTO, Notice of Allowance for U.S. Appl. No. 15/624,638, dated Feb. 28, 2019, 21 Pages.
USPTO, Non-final Office Action for U.S. Appl. No. 15/709,423, dated May 2, 2019, 21 Pages.
USPTO, Non-final Office Action for U.S. Appl. No. 16/569,273, dated Oct. 18, 2019, 21 pages.
USPTO, Non-final Office Action for U.S. Appl. No. 14/618,962, dated Feb. 26, 2016, 25 pages.
USPTO, Notice of Allowance for U.S. Appl. No. 15/415,506, dated Jul. 23, 2018, 25 pages.
USPTO, Non-final Office Action for U.S. Appl. No. 15/428,821, dated May 18, 2017, 30 pages.
USPTO, First Action Interview, Pre-Interview Communication for U.S. Appl. No. 15/709,440, dated May 16, 2019, 4 pages.
USPTO, First Action Interview, Pre-Interview Communication for U.S. Appl. No. 15/624,637, dated Oct. 19, 2018, 4 pages.
USPTO, First Action Interview, Office Action Summary for U.S. Appl. No. 15/350,040, dated Oct. 30, 2018, 4 pages.
USPTO, Non-final Office Action for U.S. Appl. No. 15/946,342, dated Jul. 26, 2018, 40 pages.
USPTO, First Action Interview, Pre-Interview Communication for U.S. Appl. No. 15/415,506, dated Apr. 5, 2018, 5 pages.
USPTO, First Action Interview, Pre-Interview Communication for U.S. Appl. No. 16/436,632, dated Aug. 14, 2020, 5 pages.
USPTO, Notice of Allowance for U.S. Appl. No. 15/386,162, dated Aug. 9, 2019, 5 pages.
USPTO, First Action Interview, Office Action Summary for U.S. Appl. No. 15/624,637, dated Jan. 25, 2019, 5 pages.
USPTO, First Action Interview, Pre-Interview Communication for U.S. Appl. No. 15/912,796, dated Jan. 8, 2020, 5 pages.
USPTO, First Action Interview, Pre-Interview Communication for U.S. Appl. No. 15/350,040, dated Jul. 16, 2018, 5 pages.
USPTO, First Action Interview, Office Action Summary for U.S. Appl. No. 15/912,796, dated Mar. 13, 2020, 5 pages.
USPTO, First Action Interview, Pre-Interview Communication for U.S. Appl. No. 15/912,809, dated Nov. 22, 2019, 5 pages.
USPTO, First Action Interview, Pre-Interview Communication for U.S. Appl. No. 15/386,760, dated Nov. 6, 2018, 5 pages.
USPTO, Notice of Allowance for U.S. Appl. No. 15/624,637, dated Apr. 19, 2019, 6 pages.
USPTO, First Action Interview, Pre-Interview Communication for U.S. Appl. No. 16/003,661, dated Aug. 29, 2018, 6 pages.
USPTO, Notice of Allowance for U.S. Appl. No. 15/238,304, dated Apr. 5, 2019, 7 pages.
USPTO, First Action Interview, Office Action Summary for U.S. Appl. No. 15/386,760, dated Jan. 30, 2019, 8 pages.
USPTO, Notice of Allowance for U.S. Design U.S. Appl. No. 29/503,386, dated Jul. 13, 2016, 8 pages.
USPTO, Final Office Action for U.S. Appl. No. 15/912,809, dated Jun. 24, 2020, 8 pages.
USPTO, Notice of Allowance for U.S. Appl. No. 15/386,760, dated Apr. 24, 2020, 9 pages.
USPTO, Notice of Allowance for U.S. Appl. No. 15/912,796, dated Aug. 20, 2020, 9 pages.
USPTO, Non-final Office Action for U.S. Design U.S. Appl. No. 29/503,386, dated Feb. 1, 2016, 9 pages.
Vinyals, O. et al., "Show and Tell: A Neural Image Caption Generator", arXiv:1411.4555v2 [cs.CV], Apr. 20, 2015, pp. 1-9.
WIPO, International Preliminary Report on Patentability for International Patent Application No. PCT/US2017/52333, dated Dec. 4, 2018, 15 pages.
WIPO, Written Opinion of the International Preliminary Examining Authority for International Patent Application No. PCT/US2017/52333, dated Aug. 17, 2018, 5 pages.
WIPO, International Search Report and Written Opinion PCT application No. PCT/US2017/052333, dated Nov. 30, 2017, 15 pages.
Yeh, et al., "Searching the web with mobile images for location recognition", Proceedings of the 2004 IEEE Computer Society Conference on Pattern Recognition, vol. 2, Jun.-Jul. 2004, pp. 1-6.
Zhao, et al., "Cloud-based push-styled mobile botnets: a case study of exploiting the cloud to device messaging service", Proceedings ACSAC '12, Proceedings of the 28th Annual Computer Security Applications Conference, ACM Digital Library, Dec. 3, 2012, pp. 119-128.
CNIPA, Second Office Action for Chinese Patent Application No. 201680070359.3, dated Jan. 6, 2021, 6 pages.
CNIPA, First Office Action for Chinese Patent Application No. 201780056982.8, dated Nov. 19, 2020, 10 pages.
EPO, Communication Pursuant to Article 94(3) EPC for European Patent Application No. 17780938.1, dated Dec. 9, 2020, 6 pages.

(56) References Cited

OTHER PUBLICATIONS

USPTO, First Action Interview, Office Action Summary for U.S. Appl. No. 16/436,632, dated Nov. 6, 2020, 5 pages.
USPTO, Notice of Allowance for U.S. Appl. No. 16/703,699, dated Dec. 11, 2020, 9 pages.
USPTO, Non-final Office Action for U.S. Appl. No. 16/881,816, dated Nov. 27, 2020, 15 pages.
EPO, Communication Under Rule 71(3) EPC for European Patent Application No. 16825666.7, dated Oct. 18, 2021, 7 pages.
JPO, Decision of Rejection for Japanese Patent Application No. 2019-518995, dated Sep. 1, 2021, 5 pages.
USPTO, Non-final Office Action for U.S. Appl. No. 17/224,949, dated Oct. 21, 2021, 13 pages.
USPTO, First Action Interview, Pre-Interview Communication for U.S. Appl. No. 17/129,010, dated Oct. 20, 2021, 4 pages.
USPTO, First Action Interview, Pre-Interview Communication for U.S. Appl. No. 16/695,967, dated Sep. 30, 2021, 6 pages.
EPO, Communication Pursuant to Article 94(3) EPC for European Patent Application No. 18716400.9, dated Apr. 14, 2022, 8 pages.
USPTO, Non-final Office Action for U.S. Appl. No. 17/110,166, dated Apr. 28, 2022, 10 pages.
USPTO, Notice of Allowance for U.S. Appl. No. 17/129,010, dated May 25, 2022, 6 pages.
CNIPA, First Office Action (with English translation) for Chinese Patent Application No. 201780069884.8, dated Dec. 17, 2021, 49 pages.
CNIPA, Notice of Proceeding with Registration Formalities and Notice of Granting a Patent Right for Invention (with English translation) for Chinese Patent Application No. 201880019712.4, dated Jan. 6, 2022, 7 pages.
EPO, Summons to Attend Oral Proceedings for European Patent Application No. 18716399.3, Jan. 13, 2022, 10 pages.
EPO, Summons to Attend Oral Proceedings for European Patent Application No. 17780938.1, Nov. 29, 2021, 11 pages.
USPTO, Final Office Action for U.S. Appl. No. 17/129,010, dated Feb. 7, 2022, 10 pages.
USPTO, Notice of Allowance for U.S. Appl. No. 17/224,949, dated Dec. 6, 2021, 12 pages.
USPTO, Final Office Action for U.S. Appl. No. 16/692,821, dated Dec. 22, 2021, 17 pages.
USPTO, Notice of Allowance for U.S. Appl. No. 16/695,967, dated Jan. 24, 2022, 21 pages.
USPTO, First Action Interview, Office Action Summary for U.S. Appl. No. 17/129,010, dated Dec. 2, 2021, 4 pages.
USPTO, Notice of Allowance for U.S. Appl. No. 16/692,821, dated Mar. 17, 2022, 9 pages.
CNIPA, Notice of Proceeding with Registration Formalities and Notice of Granting a Patent Right for Invention (with English translation) for Chinese Patent Application No. 201780069884.8, dated Jun. 6, 2022, 6 pages.
USPTO, Non-final Office Action for U.S. Appl. No. 17/340,868, dated Jun. 3, 2022, 15 pages.
USPTO, Non-final Office Action for U.S. Appl. No. 16/692,821, dated Aug. 18, 2021, 16 pages.
CNIPA, Notice of Proceeding with Registration Formalities and Notice of Granting a Patent Right for Invention (with English translation) for Chinese Patent Application No. 201780056982.8, dated Jul. 13, 2021, 4 pages.
CNIPA, Notice of Proceeding with Registration Formalities Notice of Granting a Patent Right for Invention (with English translation) for Chinese Patent Application No. 201680070359.3, dated Jul. 5, 2021, 4 pages.
CNIPA, First Office Action (with English translation) for Chinese Patent Application No. 201880019712.4, dated Jun. 22, 2021, 10 pages.
CNIPA, Notification for Patent Registration Formalities and Notification on the Grant of Patent Right for Invention (with English translation) for Chinese Patent Application No. 201680082643.2, dated Jun. 28, 2021, 4 pages.
IPO, First Examination Report for Indian Patent Application No. 201947035964, dated Jul. 15, 2021, 7 pages.

\* cited by examiner

FIG. 4B

| Model | Exact Recall @3 | Cluster Recall @3 |
|---|---|---|
| General Model (1 message context) | 12.62 % | 35.27 % |
| General Model (5 message context) | 14.82 % | 40.25 % |
| General Model (10 message context) | 15.55 % | 41.05 % |
| General Model (maximum context) | 15.74 % | 41.20 % |
| Personalized Model (maximum context) | 20.30 % | 42.04 % |

AUTOMATIC SUGGESTIONS AND OTHER CONTENT FOR MESSAGING APPLICATIONS

CROSS-REFERENCE TO RELATED APPLICATIONS

The present application is a continuation of and claims priority to U.S. patent application Ser. No. 15/386,760, filed Dec. 21, 2016 and titled AUTOMATIC SUGGESTIONS AND OTHER CONTENT FOR MESSAGING APPLICATIONS, which claims priority to U.S. Provisional Patent Application No. 62/334,305, filed May 10, 2016 and titled AUTOMATIC SUGGESTIONS AND CONVERSATIONAL COMMERCE FOR MESSAGING APPLICATIONS. U.S. patent application Ser. No. 15/386,760 also claims priority to U.S. Provisional Patent Application No. 62/308,195, filed Mar. 14, 2016 and titled AUTOMATIC SUGGESTIONS AND CONVERSATIONAL COMMERCE FOR MESSAGING APPLICATIONS. U.S. patent application Ser. No. 15/386,760 also claims priority to U.S. Provisional Patent Application No. 62/270,454, filed Dec. 21, 2015 and titled AUTOMATIC SUGGESTIONS FOR CONVERSATIONS. The contents of all of the aforementioned applications are incorporated herein by reference in their entirety.

BACKGROUND

Users increasingly rely on mobile devices instead of desktop computers for communications with other users. Mobile devices are advantageous in that they can be taken anywhere. However, with their small screens and limited bandwidth, it can be difficult for users to obtain information that they need in a timely manner. In addition, users may prefer chatting using their mobile devices; however, some information may only be available by making a phone call and speaking with a human.

SUMMARY

Implementations generally relate to messaging applications. Certain implementations may automatically analyze one or more of content of one or more messaging conversations (also referred to herein as "message exchange threads") and/or user information to automatically provide suggestions to a user within a messaging application. In certain examples, the suggestions may automatically incorporate particular non-messaging functionality into the messaging application. In certain other examples, the automatic suggestions may suggest one or more appropriate responses to be selected by a user to respond in the messaging application, and/or may automatically send one or more appropriate responses on behalf of a user.

Certain implementations enable messaging with human users and/or chat bots. In certain implementations, the automatic suggestions may be customized based on whether a chat bot is participating in the messaging conversation. That is, in certain examples, a first set of automatic responses may be suggested if a chat bot is absent in a messaging conversation, while a second set of automatic responses may be suggested if a chat bot is present in the messaging conversation, with the first and second sets of responses being at least partially different. For example, the implementations may employ an understanding of the conversational rules followed by the chat bot, and suggest responses to a user based on the rules. In other words, when a given chat bot is present, response(s) may be suggested that conform to the rules followed by the given chat bot, whereas the response(s) may not have been suggested if the given chat bot were absent (yet the messages of the conversation were the same). This mitigates the challenges that users typically have in communicating with chat bots in a language and in a format that is easily understood by the chat bots. This may also reduce network traffic and/or other computational resources by increasing the likelihood that communications to chat bots are in a language and format understood by the chat bots, which may mitigate the need for additional communications to/from the chat bots to clarify responses that do not conform to language and format requirements of the chat bots.

Some implementations provide contextually relevant suggestions during an ongoing message exchange thread and enable participants to add the suggestions (or related content) to the message exchange thread in a simple manner (e.g., via a single-tap and/or other single selection interface action). Additionally or alternatively, contextually relevant suggestions may provide participant(s) with content that is directed to a contextually relevant entity, without requiring the participant(s) to switch from an application rendering the message exchange thread to another application in order to acquire such content. This may reduce the use of certain computational resources that would otherwise be consumed in switching to another application to satisfy the informational needs. For example, switching to another application may require usage of processor, memory, and/or battery resources via launching and/or surfacing of the application. Further, switching to another application to obtain content in lieu of obtaining the content in a message exchange thread may increase the amount of time a participant needs to spend obtaining the information—which may lead to a corresponding increase in consumption of computational resources in obtaining the content.

In some implementations, a computer-implemented method implemented by one or more processors is provided and includes receiving one or more messages of a message exchange thread between multiple users. The multiple users include a first user and a second user, and the one or more messages are each submitted by a corresponding one of the multiple users via a corresponding messaging application. The method further includes determining a first bot of a first type based on the one or more messages and determining a second bot of a second type based on the one or more messages. The second type is different from the first type. In some implementations, the type of the bot corresponds to a task performed by the bot. For example, a bot of a first type may be a restaurant reservation bot and a bot of a second type may be a food order bot. The method further includes selecting the first bot over the second bot based on content within the one or more messages, and transmitting a bot command to the first bot based on the content. Transmitting the bot command to the first bot is in response to selecting the first bot over the second bot. The method further includes receiving responsive content from the first bot in response to transmitting the bot command to the first bot, and providing the responsive content from the first bot for presentation to at least the first user via the corresponding messaging application of the first user.

These and other implementations may, by selecting the first bot over the second bot, not transmit to the second bot any bot command that is based on the content. This may conserve network resources by not transmitting the bot command to the second bot and/or may conserve computational resources associated with the second bot by preventing the second bot from needing to act on the command. Moreover, these and other implementations may, by providing the responsive content for presentation via the corresponding messaging application, prevent the user from switching to another application to obtain the content, which may conserve various computational resources.

These and other implementations may optionally include one or more of the following features.

In some implementations, selecting the first bot over the second bot based on the content within the one or more messages includes: (a) determining a topic from the one or more messages; and selecting the first bot based on the topic; and/or (b) .performing semantic analysis on the one or more messages; and selecting the first bot based on the semantic analysis.

In some implementations, determining the first bot and the second bot includes: determining that at least one term, of a given message of the one or more messages, is associated with invocation of both the first bot and the second bot. In some of those implementations, selecting the first bot over the second bot based on the content includes: selecting the first bot based on at least one additional term, of an additional message of the one or more messages, being associated with invocation of the first bot but not being associated with invocation of the second bot. The additional message may be, for example, an additional message submitted in the message exchange thread prior to the given message.

In some implementations, selecting the first bot based on the content within the one or more messages includes: generating, prior to the message exchange thread, a trained machine learning model from a training set data; applying the content to the trained machine learning model to generate output over the trained machine learning model; and selecting the first bot based on the output indicating the first bot.

In some implementations, selecting the first bot over the second bot is further based on at least one of: a location of the first user and user information associated with the first user.

In some implementations, the method further includes: requesting, from an information source, additional information that is particularized to the first bot; receiving the additional information based on the requesting; and generating the bot command to conform to the first bot based on the additional information. Some of these implementations may ensure the bot command is in a format that is understood by the first bot.

In some implementations, the method further includes: determining that the one or more messages are associated with a destination; and determining a time that the first user will be at the destination. In some of those implementations, the bot command identifies the destination and the time.

In some implementations, the method further includes: determining that the first user is associated with an active role based on the one or more messages; and based on determining that the first user is associated with the active role, choosing the first user over the second user to receive the responsive content from the first bot. In those implementations, providing the responsive content from the first bot for presentation to at least the first user includes providing the responsive content for presentation to the first user without providing the responsive content for presentation to the second user. Some of these implementations thus only initially present a subset of participants of a message exchange thread with responsive content, which may prevent consumption of various computational resources of client devices of the other participant(s) not of the subset by preventing provision of responsive content to those participant(s).

In some implementations, the method further includes: receiving, responsive to providing the responsive content, a question from the first user that is directed to the first bot; responsive to receiving the question, instructing the first bot to ask a business owner of a business that is associated with the first bot for additional information; generating an answer that includes the additional information; and providing the answer for presentation to the first user in response to receiving the question. In some of those implementations, the method further includes: determining that the additional information includes new information; and updating, in one or more computer readable media, a business profile for the business based on the new information. Some of those implementations thus modify the business profile to reflect the new information and prevent the need to again ask an owner for the additional information in response to another instance of the question, which may prevent transmissions and/or other computational resource consumptions associated with again asking.

In some implementations, providing the responsive content from the first bot includes providing the first user with a user interface that includes a field that sends text entered into the field or a selection to the first bot. Some of these implementations may ensure further text and/or selections are in a format that is understood by the first bot and/or may enable the first user to provide less inputs in further communications with the first bot (e.g., the user may need to only make a single selection and/or may directly input text into the field without needing to explicitly address the text to the first bot with further inputs).

In some implementations, the method further includes: determining a writing style of the first user based on sentiment, punctuation, and/or an emoji that are in the one or more messages; and providing the responsive content to the first user in the writing style of the first user.

In some implementations, a computer-implemented method to automatically provide bot services in a messaging application includes receiving one or more messages between a first user and a second user, determining a first bot of a first type for the first user based on the one or more messages, determining a second bot of a second type for the first user based on the one or more messages, where the second type is different from the first type, selecting the first bot over the second bot based on content within the one or more messages, and providing a bot command to the first bot based on the content.

In some implementations, selecting the first bot based on content within the one or more messages includes at least one of determining a topic from the one or more messages, performing semantic analysis on the one or more messages. The method may further include determining initial words related to one or more services provided by the first bot and determining related words that are related to the initial words. Selecting the first bot based on content within the one or more messages may further include generating a machine learning model from training set data and applying the machine learning model to determine whether the content corresponds to a desire and that the content occurs during a predetermined time period when the first user is likely to act on the desire. The first bot may be selected from at least one of a bot store and a list that is part of a messaging interface. Determining the first type of bot may be further based on at least one of a location of the first user, a request that is part of the content submitted by the first user, and user information associated with the first user. The method may further include requesting additional information from the bot from a third-party server and generating the bot command based on the additional information. The method may further include determining that the one or more messages are associated with a destination, determining a time that the first user will be at the destination, and where the bot command is related to the destination and the time. Determining the first bot of the first type for the first user based on the one or more messages may further include determining that the first user is associated with an active role based on the one or more messages and choosing the first user over the second user to receive a bot suggestion from the first bot. The method may further include receiving a question from the first user that is directed to the first bot, instructing the first bot to ask a business owner of a business that is associated with the first bot for additional information, and generating an answer that includes the additional information. The method may further include determining that the additional information includes new information and providing an update to a business profile for the business based on the new information. The method may further include providing the first user with a user interface that includes a field that sends text entered into the field or a selection to the first bot. The method may further include determining a writing style of the first user based on at least one of sentiment, punctuation, and an emoji that are in the one or more messages and providing a suggestion to the first user in the writing style of the first user. The method may further include providing a suggestion to the first user to process a payment for the first user based on the one or more messages. The method may further include providing a first suggestion with two or more services, receiving a selection of one of the two or more services from the first user, and providing an additional suggestion based on the selection of the one of the two or more services. Providing the user with the additional suggestion includes providing graphical icons that the user can scroll through.

The disclosure may further include systems and methods for identifying an entity from a conversation and generating a suggestion for a user to take an action on the entity. According to some implementations of the subject matter described in this disclosure, a system has one or more processors and a memory storing instructions that, when executed, cause the system to: receive at least one conversation message from a conversation, identify an entity that may be actionable from a conversation message, determine contextual indicators of the entity, determine whether the entity is actionable based on the contextual indicators, and responsive to the entity being actionable, provide a suggestion to a user to take an action on the entity. In some instances, an item may be actionable if, based on the item, further analysis or action on that items is warranted.

In general, another implementation of the subject matter described in this disclosure may be embodied in methods that include receiving, using one or more processors, at least one conversation message from a conversation, identifying, using one or more processors, an entity that can be actionable from a conversation message, determining, using one or more processors, contextual indicators of the entity, determining, using one or more processors, whether the entity is actionable based on the contextual indicators, and responsive to the entity being actionable, providing a suggestion to a user to take an action on the entity.

These and other implementations may each optionally include one or more of the following features. For instance, the features may include performing a natural language analysis on the at least one conversation message based on a machine learning model and wherein identifying the entity that can be actionable from the conversation message and determining the contextual indicators of the entity are based on the analysis. The features may include tracking conversation flows from each participant of the conversation and refining the contextual indicators based on the tracking information. The features may include determining the suggestion for the user to take an action on based on a machine learning model and the contextual indicators. The features may include receiving, from the user, an indication to mark the entity as actionable, sending the user indication as a training signal to a machine learning model, searching for information relevant to the entity and providing the information to the user. The features may include receiving data from a variety of sources including queries and document retrievals, extracting features from the data, generating a machine learning model based on the extracted features, receiving a user action, the user action including a reaction to the suggestion provided for the entity, and training the machine learning module based on the user action. The features may include feeding entity information to an application, the entity information including participants of the conversation, generating the suggestion by the application and providing the suggestion to the participants of the conversation. The features may include detecting a question for the user in the conversation, the question being related to the entity, determining a potential user reply to the question, and providing the potential user reply in a one-tap form to the user. The features may include organizing the at least one conversation based on the contextual indicators and indexing the at least one conversation.

The disclosure may further include systems and methods for identifying an entity from a conversation and generating a suggestion for a user to take an action on the entity. According to one implementation of the subject matter described in this disclosure, a system having one or more processors and a memory storing instructions that, when executed, cause the system to: receive at least one conversation message from a conversation, identify an entity that may be actionable from a conversation message, determine contextual indicators of the entity, determine whether the entity is actionable based on the contextual indicators, and responsive to the entity being actionable, provide a suggestion to a user to take an action on the entity. In some instances, an item may be actionable if, based on the item, further analysis or action on that items is warranted.

In general, another implementation of the subject matter described in this disclosure may be embodied in methods that include receiving, using one or more processors, at least one conversation message from a conversation, identifying, using one or more processors, an entity that can be actionable from a conversation message, determining, using one or more processors, contextual indicators of the entity, determining, using one or more processors, whether the entity is actionable based on the contextual indicators, and responsive to the entity being actionable, providing a suggestion to a user to take an action on the entity.

These and other implementations may each optionally include one or more of the following features. For instance, the features may include performing a natural language analysis on the at least one conversation message based on a machine learning model and wherein identifying the entity that can be actionable from the conversation message and determining the contextual indicators of the entity are based on the analysis. The features may include tracking conversation flows from each participant of the conversation and refining the contextual indicators based on the tracking information. The features may include determining the suggestion for the user to take an action on based on a machine learning model and the contextual indicators. The features may include receiving, from the user, an indication to mark the entity as actionable, sending the user indication as a training signal to a machine learning model, searching for information relevant to the entity and providing the information to the user. The features may include receiving data from a variety of sources including queries and document retrievals, extracting features from the data, generating a machine learning model based on the extracted features, receiving a user action, the user action including a reaction to the suggestion provided for the entity, and training the machine learning module based on the user action. The features may include feeding entity information to an application, the entity information including participants of the conversation, generating the suggestion by the application and providing the suggestion to the participants of the conversation. The features may include detecting a question for the user in the conversation, the question being related to the entity, determining a potential user reply to the question, and providing the potential user reply in a one-tap form to the user. The features may include organizing the at least one conversation based on the contextual indicators and indexing the at least one conversation.

In some implementations, a method may include receiving a message between a first user and a group, the group including other users, determining a context of the message, the first user, and the other users, and determining a suggested response for each of the other users to share with the group based on the message and the context.

The method may further include generating a notification with the suggested response for a second user of the other users that allows the second user to respond with a one-tap action. The method may further include determining, based on sensor data, that the second user is in transit and where allowing the one-tap action is based on determining that the second user is in transit. Determining the suggested response may be further based on at least one of sensor data, one or more preferences, a conversation history, and one or more recent activities performed by each of the other participants. The method may further include determining one or more trending responses based on other messages in at least one of a region, market, and country related to a location of a second user of the other users and the suggested response may further include the one or more trending responses. In some implementations, the context includes at least one of a holiday and an event. In some implementations, the message is a request for a location associated with the other users and the suggested response includes the location for each of the other users. The suggested response may include at least one of an image to share with the group, a location to share with the group, and a calendar event to share with the second user. Determining the suggested response may be further based on using machine learning to develop a personalized model for a second user of the other users. Determining the suggested response may be further based on a personality of a second user of the other users and further include determining the personality of the second user based on one or more of punctuation use, emoji use, categorizing words in the message based on a whitelist as including at least one of humor and sarcasm. The method may further include providing a second user of the other users with a graphical user interface that includes an option to specify a type of personality and a level of the type of personality to be used for determining the suggested response. The context of the message may include a request for an estimated time of arrival, determining the suggested response may include determining the estimated time of arrival based on at least one of a location of the first user, a calendar event that includes a location of the calendar event, and information about a destination from a mapping application, and the suggested response may include the estimated time of arrival. The message may include a request for information about a recent event, determining the suggested response may include determining at least one of one or more images that correspond to the recent event and one or more social network posts that relate to the recent event, and the suggested response may include at least one of the one or more images and the one or more social network posts. The method may include determining a conversation starter suggestion based on a threshold passing since a last message was received in a conversation and providing the conversation starter suggestion based on at least one of a topic associated with the group, a trending topic, a recent event related to the topic associated with the group, and an activity associated with one of the users. The method may include determining whether a chat bot is present, responsive to the chat bot being present, generating the suggested response as a first set of automatic suggested responses, and responsive to the chat bot being absent, generating the suggested response as a second set of automatic suggested responses. The first set of automatic suggested responses may be based on conversational rules followed by the chat bot.

Other aspects may include corresponding methods, systems, apparatus, and computer program products.

Some implementations of the system advantageously provide a way for a user to obtain information without having to call people on the phone. In addition, some implementations of the system advantageously provides a way for business owners to automate answering of questions from users. Yet another advantage of some implementations may include a system that provides a user with an answer independent of the network connectivity available to a business owner.

BRIEF DESCRIPTION OF THE DRAWINGS

The disclosure is illustrated by way of example, and not by way of limitation in the figures of the accompanying drawings in which like reference numerals are used to refer to similar elements.

FIG. 4B illustrates a graphic representation of an example user interface that includes a conversation generated by a first application.

DETAILED DESCRIPTION

Example Systems

Figure 1A:
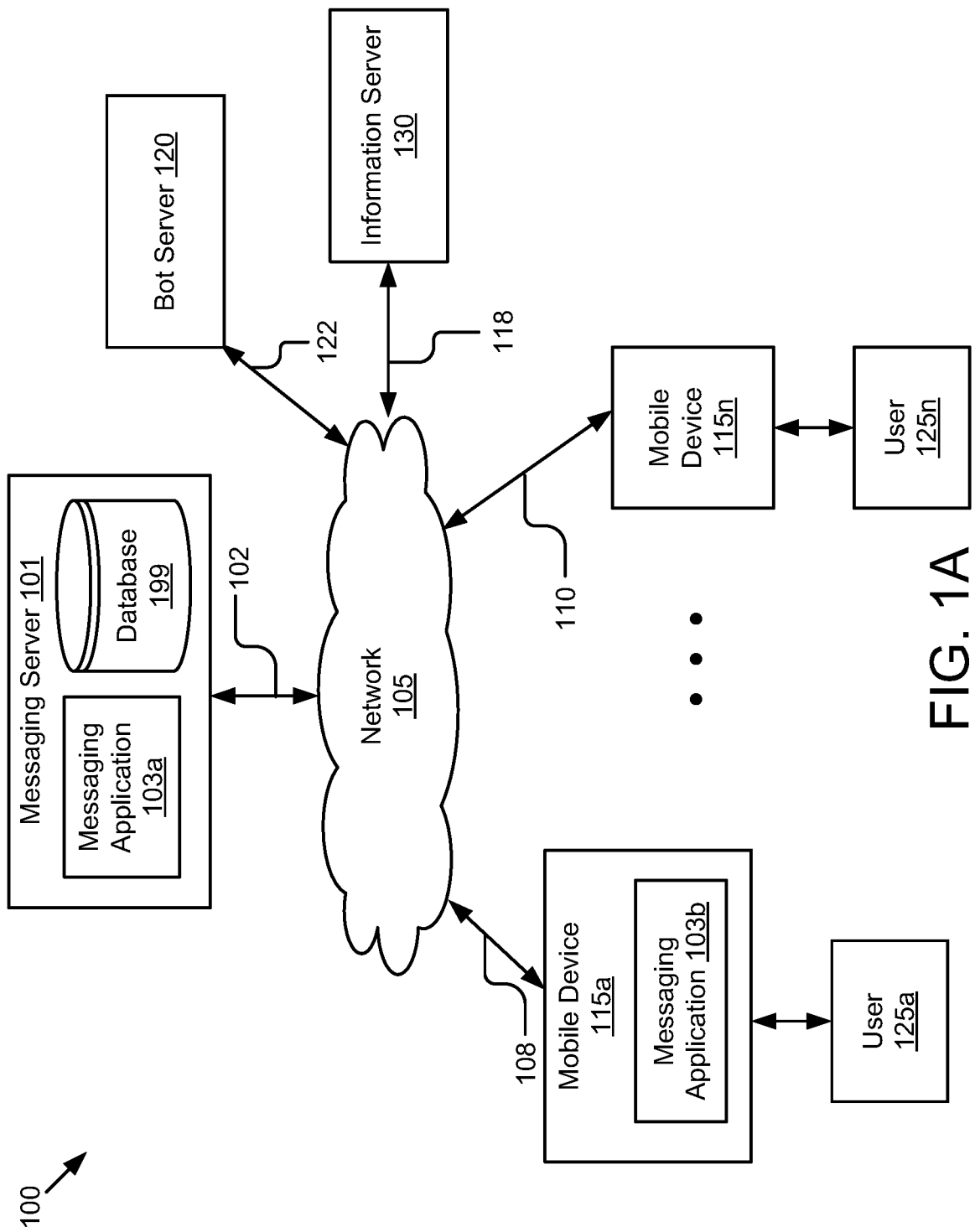
FIG. 1A illustrates a block diagram of an example system that transmits messages and provides suggestions to mobile devices.

FIG. 1A illustrates a block diagram of an example system 100 that transmits messages and provides suggestions to mobile devices. The illustrated system 100 includes a messaging server 101, mobile devices 115a, 115n, a bot server 120, an information server 130, and a network 105. Users 125a-125n may be associated with respective mobile devices 115a, 115n. In some implementations, the system 100 may include other servers or devices not shown in FIG. 1A such as a standalone social network server. In FIG. 1A and the remaining figures, a letter after a reference number, e.g., "115a," represents a reference to the element having that particular reference number. A reference number in the text without a following letter, e.g., "115," represents a general reference to implementations of the element bearing that reference number.

In the illustrated implementation, the messaging server 101, the mobile devices 115, the bot server 120, and the information server 130 are communicatively coupled via a network 105. The network 105 may be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some implementations, the network 105 may be a peer-to-peer network. The network 105 may also be coupled to or include portions of a telecommunications network for sending data in a variety of different communication protocols. In some implementations, the network 105 includes Bluetooth communication networks, WiFi, or a cellular communications network for sending and receiving data including via short messaging service (SMS), multimedia messaging service (MMS), hypertext transfer protocol (HTTP), direct data connection, email, etc. Although FIG. 1A illustrates one network 105 coupled to the mobile devices 115 and the messaging server 101, in practice one or more networks 105 may be coupled to these entities.

The messaging server 101 may include a processor, a memory, and network communication capabilities. In some implementations, the messaging server 101 is a hardware server. The messaging server 101 is communicatively coupled to the network 105 via signal line 102. Signal line 102 may be a wired connection, such as Ethernet, coaxial cable, fiber-optic cable, etc., or a wireless connection, such as Wi-Fi, Bluetooth, or other wireless technology. In some implementations, the messaging server 101 sends and receives data to and from one or more of the mobile devices 115a-115n, the bot server 120, and the information server 130 via the network 105. The messaging server 101 may include a messaging application 103a and a database 199.

The messaging application 103a may be code and routines operable by the processor to exchange messages and provide suggestions. In some implementations, the messaging application 103a may be implemented using hardware including a field-programmable gate array (FPGA) or an application-specific integrated circuit (ASIC). In some implementations, the messaging application 103a may be implemented using a combination of hardware and software.

The database 199 may store messages transmitted between mobile devices 115, information provided by the information server 130, etc. The database 199 may also store social network data associated with users 125, contact information, etc.

The mobile device 115 may be a computing device that includes a memory and a hardware processor, for example, a camera, a laptop computer, a tablet computer, a mobile telephone, a wearable device, a mobile email device, a portable game player, a portable music player, a reader device, or other electronic device capable of wirelessly accessing a network 105.

In the illustrated implementation, mobile device 115a is coupled to the network 105 via signal line 108 and mobile device 115n is coupled to the network 105 via signal line 110. Signal lines 108 and 110 may be wireless connections, such as Wi-Fi, Bluetooth, or other wireless technology. Mobile devices 115a, 115n are accessed by users 125a, 125n, respectively. The mobile devices 115a, 115n in FIG. 1A are used by way of example. While FIG. 1A illustrates two mobile devices, 115a and 115n, the disclosure applies to a system architecture having one or more mobile devices 115.

In some implementations, the mobile device 115 can be a wearable device worn by the user 125. For example, the mobile device 115 is included as part of a clip (e.g., a wristband), part of jewelry, or part of a pair of glasses. In another example, the mobile device 115 can be a smart watch. The user 125 can view images from the messaging application 103 on a display of the device worn by the user 125. For example, the user 125 can view the images on a display of a smart watch or a smart wristband.

In some implementations, the messaging application 103b is stored on a mobile device 115a. The messaging application 103 may include a thin-client messaging application 103b stored on the mobile device 115a and a messaging application 103a that is stored on the messaging server 101. For example, the messaging application 103b may transmit user messages created by the user 125a on the mobile device 115a to the messaging application 103a stored on the messaging server 101. The messaging application 103a on the messaging server may determine suggestions to provide to the user 125a. For example, the messaging application 103a may transmit commands to the bot server 120 and receive suggestions from the bot server 120 that the messaging application 103a provides to the messaging application 103b for display. For example, the messaging application 103a may transmit the suggestions to the messaging application 103b as computer-executable instructions that cause the messaging application 103b to visually render the suggestions.

In some implementations, the messaging application 103 may be a standalone application stored on the messaging server 101. A user 125a may access the messaging application 103 via a web page using a browser or via other software on the mobile device 115a. In some implementations, the messaging application 103 may include the same components on the mobile device 115a as are included on the messaging server 101.

The bot server 120 may include a processor, a memory and network communication capabilities. In some implementations, the bot server 120 is a hardware server. The bot server 120 is communicatively coupled to the network 105 via signal line 122. Signal line 122 may be a wired connection, such as Ethernet, coaxial cable, fiber-optic cable, etc., or a wireless connection, such as Wi-Fi, Bluetooth, or other wireless technology. In some implementations, the bot server 120 sends and receives data to and from one or more of the messaging server 101, the mobile devices 115a-115n, and the information server 130 via the network 105. Although the bot server 120 is illustrated as being one server, multiple bot servers 120 are possible.

The bot server 120 may be controlled by the same party that manages the messaging server 101, or may be controlled by a third-party. In some implementations, where the bot server 120 is a third-party bot server controlled by an entity that is distinct from an entity that controls the messaging server 101, the messaging server 101 and the third-party bot server may communicate via an application programming interface (API). In some implementations, the bot server 120 hosts one or more bots. The bots may be computer programs that perform specific functions to provide suggestions, for example, a reservation bot makes reservations, an auto-reply bot generates reply message text, a scheduling bot automatically schedules calendar appointments, etc. The bot server 120 may provide the bots to the messaging application 103, for example, the code for the bot may be incorporated into the messaging application 103 or the messaging application 103 may send requests to the bot server 120. In some implementations, the messaging application 103 acts as an intermediary between the user 125 and the bot server 120 by providing the bot server 120 with bot commands and receiving, from the bot server 120, suggestions based on the bot commands. For example, a bot command may be transmitted by the messaging application 103 to the bot server 120 over network 105 and, in response, the bot server may transmit suggestions or other responsive content back to the messaging application 103 over network 105.

The information server 130 may include a processor, a memory and network communication capabilities. In some implementations, the information server 130 is a hardware server. The information server 130 is communicatively coupled to the network 105 via signal line 118. Signal line 118 may be a wired connection, such as Ethernet, coaxial cable, fiber-optic cable, etc., or a wireless connection, such as Wi-Fi, Bluetooth, or other wireless technology.

The information server 130 may provide information to the messaging application 103. For example, the information server 130 may maintain an electronic encyclopedia, a knowledge graph, a social network application (e.g., a social graph, a social network for friends, a social network for business, etc.), a website for a place or location (e.g., a restaurant, a car dealership, etc.), a mapping application (e.g., a website that provides directions), etc. Although the information server 130 is illustrated as a single server, the information server 130 may include multiple servers, such as a separate server for a social network application, an electronic encyclopedia, and a mapping application.

The information server 130 may receive a request for information from the messaging application 103, perform a search, and provide the information in the request. For example, the messaging application 103 may request driving directions or an estimated time of arrival from the mapping application. In some implementations, the information server 130 may receive information from the messaging application 103. For example, where the information server 130 maintains a website about a restaurant, the messaging application 103 may provide the information server 130 with updated information about the restaurant, such as a user's favorite dish at the restaurant.

As long as a user consents to the use of such data, the information server 130 may provide the messaging application 103 with profile information or profile images of a user that the messaging application 103 may use to identify a person in an image with a corresponding social network profile. In another example, the information server 130 may provide the messaging application 103 with information related to entities identified in the messages used by the messaging application 103. For example, the information server 130 may include an electronic encyclopedia that provides information about landmarks identified in the images, an electronic shopping website that provides information for purchasing entities identified in the messages, an electronic calendar application that provides, subject to user consent, an itinerary from a user identified in a message, a mapping application that provides information about nearby locations where an entity in the message can be visited, a website for a restaurant where a dish mentioned in a message was served, etc.

In some implementations, the information server 130 may communicate with the bot server 120. For example, where the information server 130 maintains a website for a used car dealership, the bot server 120 may request that the information server 130 ask the owner of the used car dealership whether they currently provide car detailing work. The information server 130 may provide the requested information to the bot server 120.

In some implementations, the information server 130 may receive a link from the messaging application 103 that is associated with a published chat. The information server 130 may display the link along with information about a business associated with the published chat provided by the information server 130. For example, where the information server 130 provides a mapping application, the information server 130 may provide the link in conjunction with a map that includes the location of the business. If a user 125 selects the link, the user device 115 may open the messaging application 103 so that the user 125 can chat with someone that represents the business (e.g., a bot, an agent, or a business owner). In another example, the information server 130 may provide search services and receive a query from the user 125 about a bike store. The information server 130 may provide search results that include a website for the bike store and a link that the user 125 may select to chat with someone that represents the bike store.

Figure 1B:
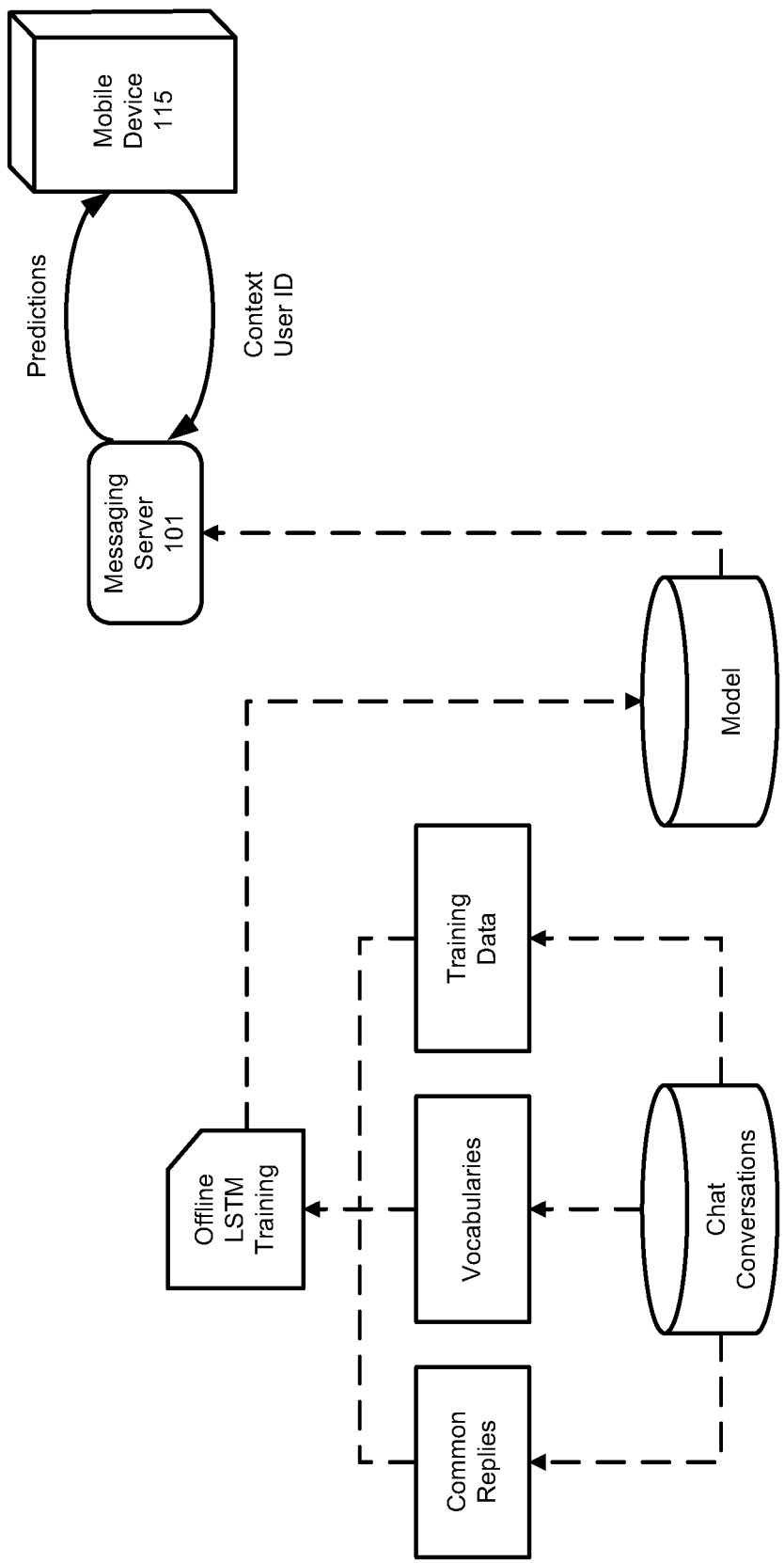
FIG. 1B illustrates a block diagram of another example system for generating suggestions.

Turning to FIG. 1B, another example system for generating suggestions is illustrated. In this example, the messaging server 101 may receive suggestions from a model that uses a neural network, such as long short-term memory (LSTM) neural network model. LSTM is a recurrent neural network model that may exploit long contexts in a compact way. In some implementations, a database of chat conversations is used to determine common replies, vocabularies, and training data that are used during LSTM training and stored as part of a model. For example, the last five to ten messages transmitted between parties in a conversation may be used to predict the next suggested response based on the model. These inputs may be stored as part of the messaging server 101 in a separate location. The model may provide the suggestions to the messaging server 101 which makes predictions about which suggestions are useful to a user of the mobile device 115 based on context, a user identifier associated with the mobile device 115, and a time since the last message was received.

Example Computing Device

Figure 2:
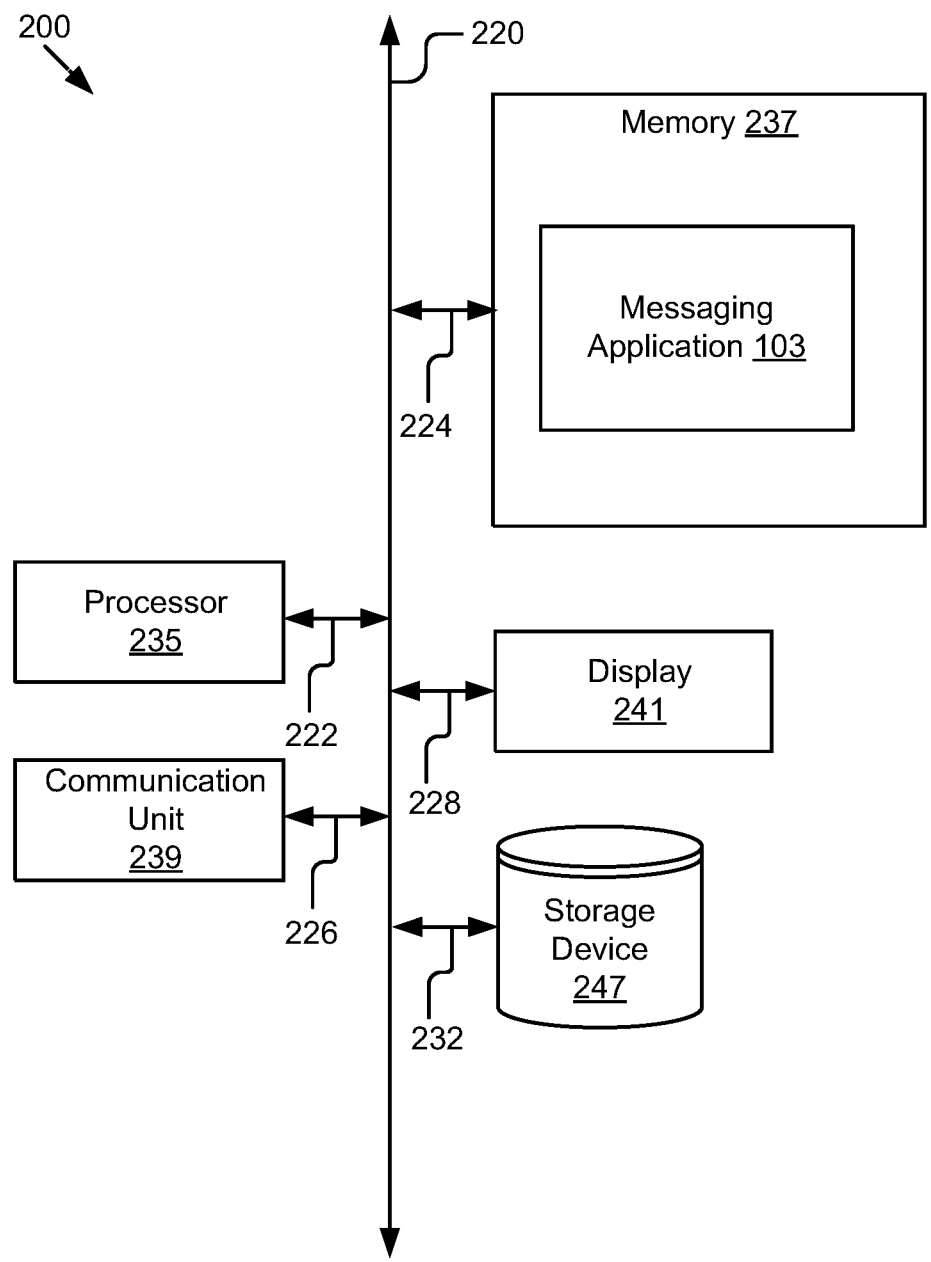
FIG. 2 illustrates a block diagram of an example computing device that transmits messages and provides suggestions to mobile devices.

FIG. 2 illustrates a block diagram of an example computing device 200 that transmits messages and provides suggestions to mobile devices. The computing device 200 may be a messaging server 101 or a mobile device 115. The computing device 200 may include a processor 235, a memory 237, a communication unit 239, a display 241, and a storage device 247. A messaging application 103 may be stored in the memory 237. The components of the computing device 200 may be communicatively coupled by a bus 220.

The processor 235 includes an arithmetic logic unit, a microprocessor, a general purpose controller or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations may be part of the computing device 200. The processor 235 is coupled to the bus 220 for communication with the other components via signal line 222.

The memory 237 stores instructions that may be executed by the processor 235 and/or data. The instructions may include code for performing the techniques described herein. The memory 237 may be a dynamic random access memory (DRAM) device, a static RAM, or some other memory device. In some implementations, the memory 237 also includes a non-volatile memory, such as a (SRAM) device or flash memory, or similar permanent storage device and media including a hard disk drive, a floppy disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the messaging application 103, which is described in greater detail below. The memory 237 is coupled to the bus 220 for communication with the other components via signal line 224.

The communication unit 239 transmits and receives data to and from at least one of the mobile device 115, the messaging server 101, the bot server 120, and the information server 130 depending upon where the messaging application 103 is stored. In some implementations, the communication unit 239 includes a port for direct physical connection to the network 105 or to another communication channel. For example, the communication unit 239 includes a universal serial bus (USB), secure digital (SD), category 5 cable (CAT-5) or similar port for wired communication with the mobile device 115 or the messaging server 101, depending on where the messaging application 103 may be stored. In some implementations, the communication unit 239 includes a wireless transceiver for exchanging data with the mobile device 115, messaging server 101, or other communication channels using one or more wireless communication methods, including IEEE 802.11, IEEE 802.16, Bluetooth or another suitable wireless communication method. The communication unit 239 is coupled to the bus 220 for communication with the other components via signal line 226.

In some implementations, the communication unit 239 includes a cellular communications transceiver for sending and receiving data over a cellular communications network including via short messaging service (SMS), multimedia messaging service (MMS), hypertext transfer protocol (HTTP), direct data connection, e-mail or another suitable type of electronic communication. In some implementations, the communication unit 239 includes a wired port and a wireless transceiver. The communication unit 239 also provides other conventional connections to the network 105 for distribution of files and/or media objects using standard network protocols including, but not limited to, user datagram protocol (UDP), TCP/IP, HTTP, HTTP secure (HTTPS), simple mail transfer protocol (SMTP), SPDY, quick UDP internet connections (QUIC), etc.

The display 241 may include hardware operable to display graphical data received from the messaging application 103. For example, the display 241 may render graphics to display a user interface. The display 241 is coupled to the bus 220 for communication with the other components via signal line 228. Other hardware components that provide information to a user may be included as part of the computing device 200. For example, the computing device 200 may include a speaker for audio interfaces, a microphone to capture audio, or other types of output devices. In some implementations, the computing device 200 may not include all the components. For example, where the computing device 200 is a messaging server 101, the display 241 may be optional. In implementations where the computing device 200 is a wearable device, the computing device 200 may not include storage device 247. In some implementations, the computing device 200 may include other components not listed here, e.g., one or more cameras, sensors, a battery, etc.

The storage device 247 may be a non-transitory computer-readable storage medium that stores data that provides the functionality described herein. In implementations where the computing device 200 is the messaging server 101, the storage device 247 may include the database 199 in FIG. 1A. The storage device 247 may be a DRAM device, a SRAM device, flash memory or some other memory device. In some implementations, the storage device 247 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a permanent basis. The storage device 247 is coupled to the bus 220 for communication with the other components via signal line 232.

Example Chat Bot Integration in Messaging Applications

Figure 3:
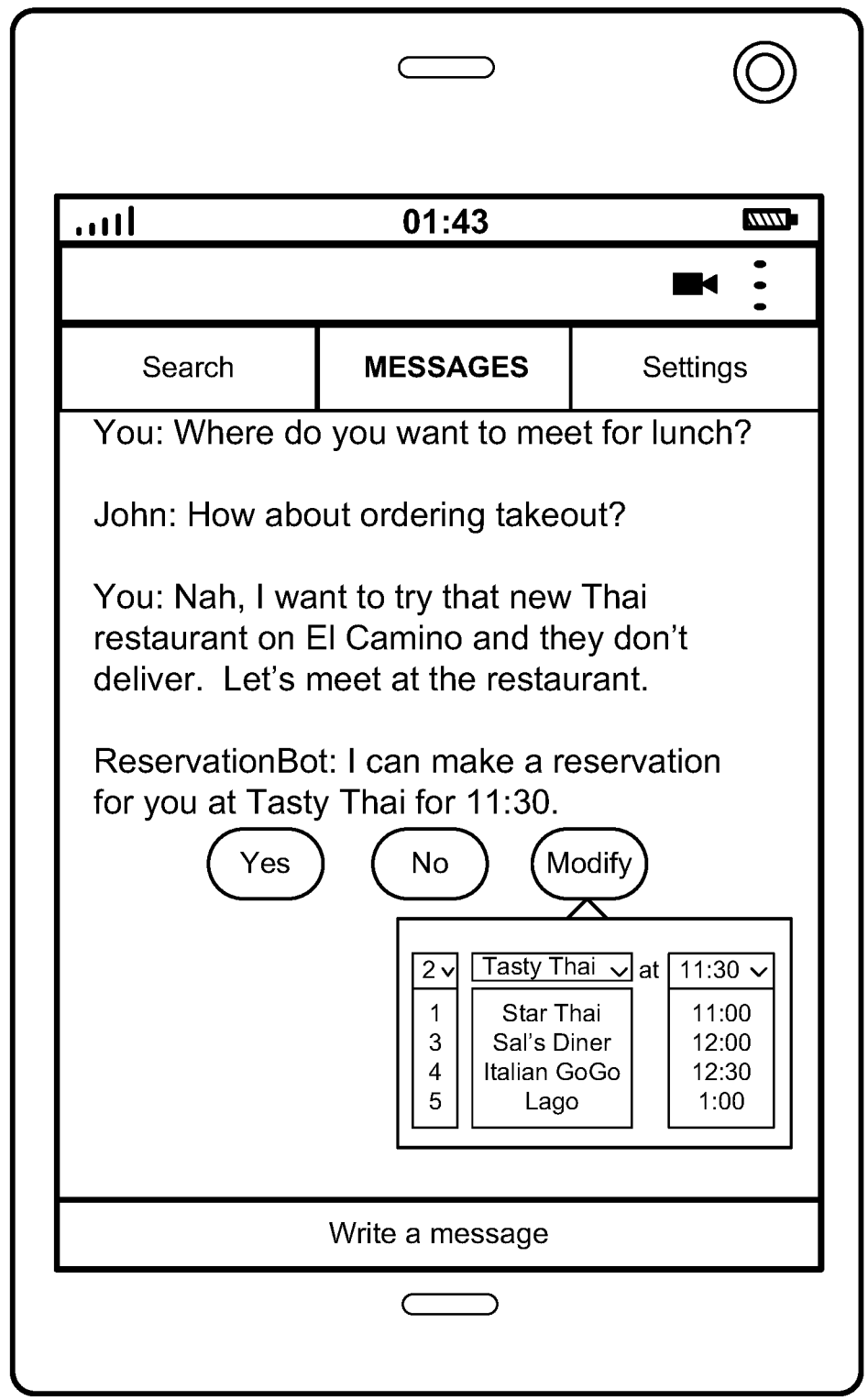
FIG. 3 illustrates a graphic representation of a user interface that includes a suggestion from a bot.

Turning to FIG. 3, a graphic representation 300 of a user interface that includes a suggestion from a bot is illustrated and discussed below. In some implementations, messages are received between a first user and a second user, for example, a user identified as "You" and a user identified as "John." In this example, the first user and the second user are participating in a real-time chat about where they would like to eat lunch. In another example, the first user may be a customer and the second user may be a business owner. In some implementations, the messages may be from a first user that is directing the messages to bots instead of other users. For example, the messages may be communicated between a first user and a particular food truck bot, where the first user is looking to see if the particular food truck still has chicken available. In some implementations, the messages may be between more than two users.

In some implementations, the first user sends a message to a second user or a bot by messaging a phone number (e.g., when the messaging application 103 works over SMS) or selecting the user or the bot from a contacts list (e.g., when the messaging application 103 works over rich communications services (RCS) or another chat interface). In some implementations, the messaging application 103 provides group messages from multiple entities associated with a bot from a single SMS number so that it appears to the first user that messages are coming from a single source.

A first bot of a first type may be determined for the first user based on the messages. The bot may be a human agent, an automated agent, an automatic responder, etc. In some implementations, the bot may be a hybrid where communications are provided by multiple entities that may include a human agent at some points, and an automatic agent at some other points. For example, the bot may be named Mike's Bikes so that both the business owner Mike and an automated bot may interact with the first user. In addition, it allows multiple entities to interact with the first user without the first user getting confused about managing the multiple entities individually.

The messaging application 103 may determine the first bot of the first type based on a location of the first user, a request that is part of the content submitted by the first user, and/or upon user consent, user information associated with the first user. For example, the first bot may be a reservation bot that is determined based on the first user writing "I want to try that new Thai restaurant." because the first user indicates a desire to visit a physical location of a restaurant.

A second bot of a second type for the first user may be determined based on the messages. For example, the second bot may include a food order bot that automatically orders food for the first user. The second bot may be determined based on detecting words in the messages, such as "lunch" and "ordering."

The first bot may be selected over the second bot based on content within the one or more messages. For example, the first bot may be selected based on "meet" appearing more times than "order" in the messages. The first bot may be selected from a bot store that is maintained (e.g., in one or more databases) by the messaging application 103 or by the bot server 120. Alternatively or additionally, the first bot may be included in a list that is part of a messaging interface that is visible to the first user and the second user.

In some implementations, the messaging application 103 selects the first bot based on determining a topic from the messages. For example, the topic may be food and is determined based on the word "lunch." The messaging application 103 may additionally or alternatively select the first bot based on performing semantic analysis on the messages. For example, the first bot may be selected based on "order" being followed with a negative sentiment (e.g., "no" or in this example "nah"). In some situations, a trained sentiment classifier may be utilized to determine the sentiment of a word and/or a string of text. Additionally or alternatively, the first bot may be selected based on determining initial words related to one or more services provided by the first bot and determining related words that are related to the initial words. For example, the first bot may be determined based on detecting the initial word "lunch" and the related word "meet," which relate to the service of making restaurant reservations.

In some implementations, the messaging application 103 additionally or alternatively selects the first bot based on machine learning. For example, the messaging application 103 may generate a machine learning model from training set data and apply the machine learning model to determine whether the content corresponds to a desire and that the content occurs during a predetermined time period when the first user is likely to act on the desire. For example, continuing with the example above, the messaging application 103 may determine that the desire is to eat lunch at a restaurant and that the users are likely to act on the desire because, based on user consent to use their location histories, the users are typically at restaurants and/or the users have been known to be at restaurants together at 11:30 a.m.

In some implementations, the messaging application 103 determines that a given message of the messages includes one or more terms that are associated with invocation of two or more bots. For example, a given message of "reservations?" may be associated with invocation of both a restaurant reservation bot and a separate airline reservation bot. In some of those implementations, the messaging application 103 selects one of the bots over the other bots based on one or more additional terms of an additional message of the messages also being associated with invocation of the selected bot, but not being associated with invocation of the non-selected bot(s). For example, if "lunch" and/or "restaurant" are present in an additional message (e.g., a preceding message) the restaurant reservation bot may be selected in lieu of the airline reservation bot. Terms that are associated with invocations of bots and/or otherwise associated with bots may be stored in association with the bots in one or more databases.

A bot command may be provided to the first bot based on the content. For example, the messaging application 103 may instruct the first bot to offer to make a reservation for the first user and the second user at the restaurant discussed in messages exchanged between them. The first bot may determine various factors that are not explicitly discussed in the messages and make the offer based on the determined factors. For example, the first bot may determine the name of the restaurant based on the words "new Thai restaurant" and "El Camino" in the messages and determine that the users would prefer to go at 11:30 a.m. based on user activity associated with the users that corresponds to the users eating together at 11:30 a.m. In some implementations, the messaging application 103 determines that the messages are associated with a destination, determines a time that the first user will be at the destination, and the bot command is related to the destination and the time. In some implementations, the first bot may provide a standard introduction (e.g., "Hi, I'm first bot") and then provides an offer.

In another example, the first user may send a message to multiple bike shop bots asking if the shops have a specific brand and model of bike in stock. In yet another example, the first user may send a message to an air conditioning repair guy to schedule an appointment to fix the first user's air condition, schedule an appointment, and pay by credit card.

In some implementations, the messaging application 103 requests additional information for the first bot from an information server and generates the bot command based on the additional information. For example, the messaging application 103 may request information from a search server or a server that provides knowledge cards (e.g., rich cards). In another example, the messaging application may request additional information from the information server 130 that includes different restaurants that the first user might want to eat at. In FIG. 3, the messaging application 103 may request information about restaurants that offer Thai food that are located on El Camino, restaurants that are near the location of the first user, restaurants that have high ratings, etc. The first bot may incorporate the restaurant names into an offer to make reservations at those restaurants for two people at times that are currently available for reservations.

The messaging application 103 may provide a suggestion to the first user and the second user. For example, the messaging application 103 provides on behalf of the first bot, an offer to make a reservation at Tasty Thai. In some implementations, the messaging application 103 may determine that the first user is associated with an active role based on the messages and choose the first user over the second user to receive a bot suggestion from the first bot. For example, where two users are discussing a trip together the messaging application 103 may determine that one of the users is an organizer for the event and the bot suggestion may include a suggestion for the organizer to pay for a car service. Determining that the one of the users is an organizer may be based on various factors, such as that user initiating the conversation, that user providing more messages to the conversation, that user's messages including more terms that relate to the selected bot than do message(s) of other user(s).

In some implementations, the suggestion may include an advertisement. For example, the first bot may provide the first user with a coupon for 30% off at Tasty Thai. The messaging application 103 may determine a writing style of the first user based on sentiment, punctuation, or an emoji that are in the messages and provide a suggestion to the first user in the writing style of the first user. For example, if the first user tends to write messaging with no capitalization, the messaging application 103 may provide the suggestion with no capitalization. The messaging application 103 may provide a suggestion to the first user to process a payment for the first user related to the messages within the messaging application 103. For example, the messaging application 103 may select a third bot that offers to process a payment for the meal at Tasty Thai or reimburse the first user if the first user pays for the second user's food.

In some implementations, the first bot may provide an automated response when the first user requests information that is available to the first bot, such as where the bike shop is located. In some implementations, the first bot may communicate with the business owner to obtain additional information if the first bot does not have access to requested information or the information is associated with a confidence score that falls below a threshold value. For example, the first user may ask if the bike shop is open. Although the posted hours may state that the business is open, if the business owner has not been active on the messaging application 103 for several hours or the bike shop is known to close with no warning, the first bot may ask the business owner for confirmation that the bike shop is open. In some implementations, where the first bot asks the business owner for additional information, the first bot may provide the business owner with suggested responses. Continuing with the example about whether the bike shop is open, the first bot may provide the business owner with the option to respond with "Yes until 5 pm," "No, but we're open tomorrow starting at 10 am," or an option to provide a different answer.

In some implementations, the suggestion may be shared with other conversations. The messaging application 103 may determine that people connected to the two users may want to view the suggestion. For example, if the two users frequently go out to lunch with a third user, the third user may want to know that the two users are going to eat at Tasty Thai at 11:30. In another example, the messaging application 103 may share the suggestion with people that are unrelated to the two users but that are having a similar conversation.

The messaging application 103 may provide the first user with a user interface that includes a field that sends text entered into the field or a selection to the first bot. For example, in FIG. 3, responsive to the ReservationBot suggesting to make a reservation for the user at Tasty Thai for 11:30, the user may accept the suggestion or modify the suggestion to select a different number of people, a different restaurant, and a different reservation time.

In some implementations, the messaging application 103 may update information based on interactions between one of the users and the first bot. For example, the messaging application 103 may receive a question from the first user that is directed to the first bot about Tasty Thai's hours of operation. The messaging application 103 may instruct the first bot to ask a business owner of Tasty Thai for the additional information about Tasty Thai's hours of operation by transmitting a request, such as an email, to a third-party server 120 associated with Tasty Thai. In some implementations, the first bot may respond to the question from the first user unless the first bot determines that the answer is associated with a confidence score that falls below a predetermined threshold value—in which case it may then ask the business owner for an answer. The business owner's answer may then be used to update, in one or more databases, an entry for "Tasty Thai" with information from the answer (e.g., Tasty Thai's hours of operation). In some implementations, the business owner may be able to answer the question at any time. In some implementations, the first bot asks the business owner questions, without first being prompted by a user, to enable answers to be proactively available to users. For example, the first bot may ask the business owner if the business is open on Christmas, store the answer in association with the business, and then provide the answer to a user in response to a message directed to a corresponding bot that enquires about Christmas hours of the business.

The messaging application 103 may receive the additional information and generate an answer that includes the additional information for the first user. In instances where the additional information includes new information, the messaging application 103 may provide an update to a business profile for the business based on the new information. For example, the messaging application 103 may instruct the first bot to transmit the update to a website that maintains business information. The first bot may also transmit an update to the website that maintains business information for information that comes from the first bot proactively asking the business owner a question.

In some implementations, the messaging application 103 may provide a first suggestion that includes two or more services to be performed by the first bot. For example, the messaging application 103 may provide an offer to make the reservation, provide additional information about the restaurant, and rate the restaurant. The messaging application 103 may receive a selection of one of the two or more services from the first user, for example, the first user asks the first bot to make the reservation. The messaging application 103 may provide the first user with additional suggestions corresponding to the selected service. For example, the messaging application 103 provides a second suggestion to select the restaurant, pick a time, and select a number of people for the reservation. In some implementations, providing the additional suggestion includes providing graphical icons that the user can scroll through. In some implementations, the additional suggestion includes an advertisement.

Example Overview—Summarizing Conversations

In some implementations, the messaging application 103 analyzes messages that are part of an initial conversation between two or more users to determine one or more entities that may be associated with an action. An entity can be a person, place, or object in the message. For example, the suggestion application 132 identifies that the message "great weather!" includes "great," "weather" and "!" based on parsing the message, and determines a first entity "great" and a second entity "weather" from the message.

Other messages in the initial conversation are analyzed to determine contextual indicators. In some implementations, the messaging application 103 analyzes other conversations (e.g., previous conversations, conversations from a third-party application) related to one or more of the users. For example, from the message "would you like to meet at ABC coffee store?" and user profile information, the messaging application 103 determines, subject to user consent, that an entity "ABC coffee store" is near the user's work location. Other contextual indicators include sentiment indicators, conversation flows, tense of the message, recency of the message, the day and/or time at which the message was sent, the day and/or time associated with the entity, conversation metadata, etc.

The messaging application 103 determines contextual indicators and, based on the contextual indicators, determines whether the entity is actionable. The contextual indicators may include conversation flows, tense, sentiment indicators (e.g., an emotion symbol), verbs used in the message, whether a question is asked in the message, conversation metadata, etc. For example, the messaging application 103 determines the entity A in the message "I like A" is non-actionable, but determines that the entity B in the message "I am going to buy B" is actionable. If user C asks user D "meet at XYZ?," the messaging application 103 may determine that the location "ABC" is actionable after receiving user D's positive answer in the conversation flow.

The messaging application 103 generates a suggestion for an actionable entity based on the contextual indicators. For example, if two users want to meet at a store, the messaging application 103 could provide the users with directions to the store and a calendar entry to schedule a meeting time. Based on the contextual indicators, a map may indicate directions to a particular store close to both users, and a calendar may highlight time slots that are available to both of the users.

The suggestion generation process may include several types of automation. For example, the messaging application 103 may determine whether to generate a suggestion, and when and where in the conversation to insert the suggestion. For a question "meet at coffee house?" from user A to user B, the map to the coffee house may be suggested to the two users if user B answers "great!" to the question. For example, the map suggestion may not be provided to the two users if user B answers "I'd like to go, but . . . ." The messaging application 103 may also determine whether a suggestion is appropriate based on the contextual indicators. For example, if a user recently received bad news, a celebration suggestion would be inappropriate. In another example, the messaging application 103 may determine a list of entities that the user dislikes and, the messaging application 103 may not suggest anything from the list to the user.

Figure 4A:
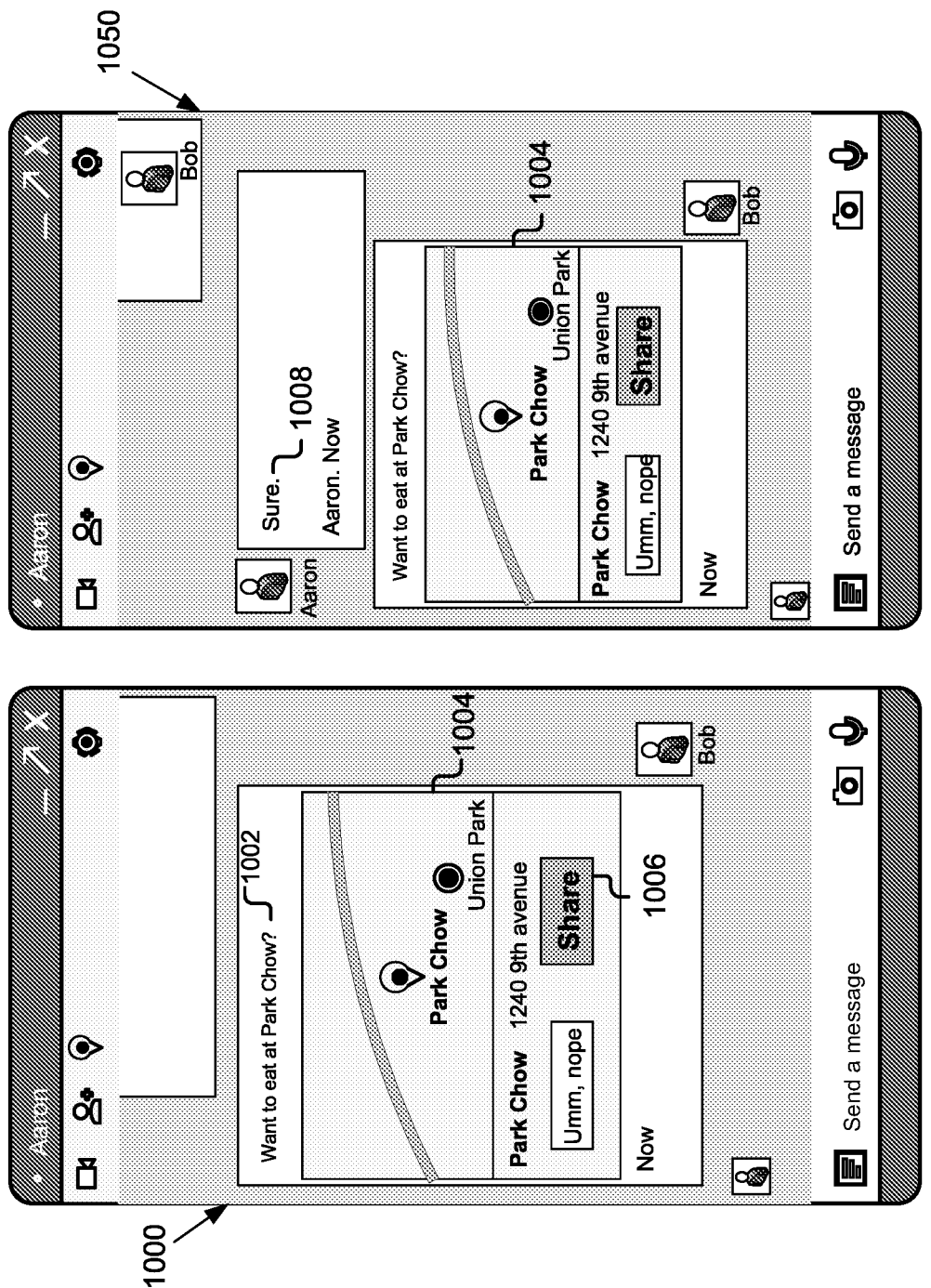
FIG. 4A illustrates graphic representations of example user interfaces that includes a suggestion.

FIG. 4A includes graphic representations of example conversation interfaces showing a suggestion. In the illustrated example, the conversation interfaces 1000, 1050 are displayed on Aaron's mobile screen. Aaron receives a message 1002 "Want to eat at Park Chow?" from Bob. The messaging application 103, which is described above with reference to FIGS. 1 and 2, determines that the location "Park Chow" is actionable. A suggestion therefore can be generated for Aaron and Bob to take an action on the location. In this example, the messaging application 103 generates a map 1004 of the location "Park Chow" for Aaron and Bob. Aaron and Bob can view the map 1004 or share the map 1004 using the share button 1006. In this scenario, the map 1004 is displayed twice before and after Aaron sends a message 1008 "Sure" to respond the message 1002. In a different scenario, the determining engine 228 determines that the location "Park Chow" is actionable only if Aaron positively answers the question 1002, for example, with the message 1008 "Sure". As a result, the location suggestion (e.g., the map 1004) may only be displayed once after Aaron sends the message 1008. Aaron and Bob may also select the "Umm, nope" option 1010 to indicate that the map is not the suggestion the users want or the map is wrong or other negative reactions. In FIG. 10, the entire suggestion generation process is handled by a messaging application 103.

Figure 4B:
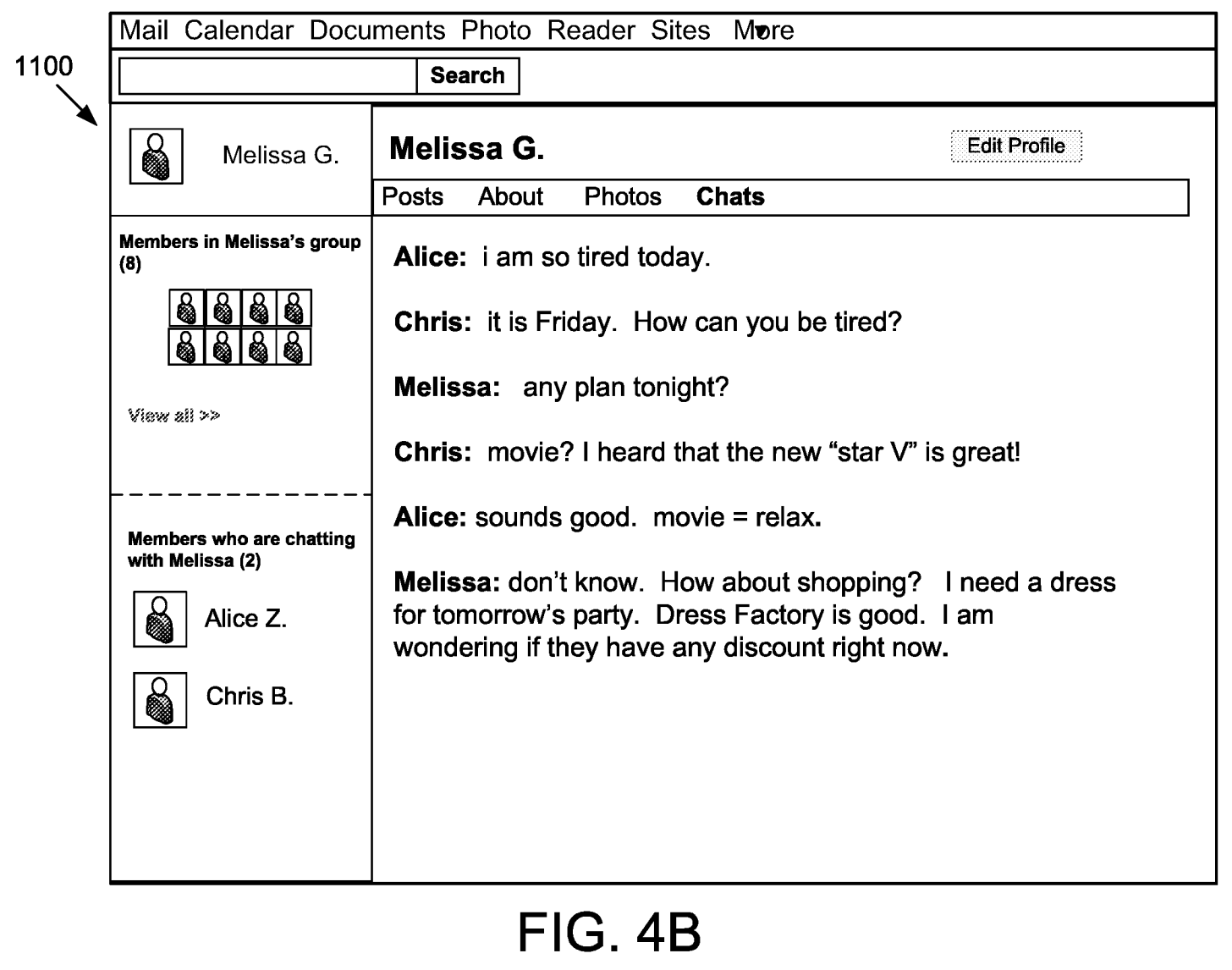

FIG. 4B is a graphic representation of an example conversation interface showing a conversation generated by a conversation service. An ongoing conversation between users Melissa G., Alice Z., Chris B. is displayed on the conversation interface 1100. The users Melissa G., Alice Z., Chris B may be members of a social network in this non-limiting example. The conversation session between the users is generated and managed by a first application (e.g., a messaging application 103) in the social network. The conversation interface 1100 can be displayed on Melissa's computer screen. In this example, the users converse about a plan that night, Melissa expresses interest in shopping and states that "Dress Factory is good. I am wondering if they have any discount right now." When the messaging application 103 identifies that the important entities in this message are "Dress Factory" and "discount," the messaging application 103 generates a suggestion based on these important entities. However, instead of generating a suggestion by the messaging application 103 as in FIG. 10, the messaging application 103 feeds the information "Dress Factory" and "discount" to another service (e.g., a promotion service) to generate a suggestion.

Figure 4C:
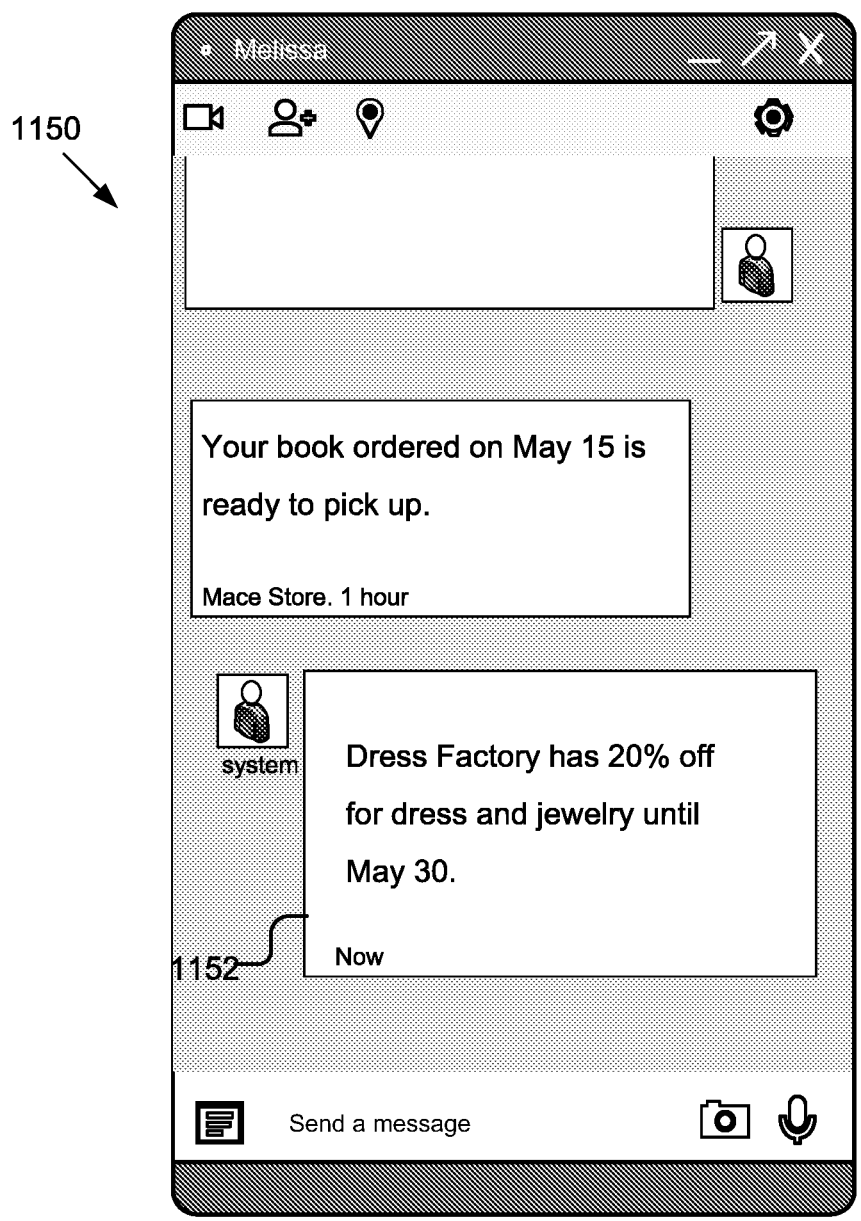
FIG. 4C is a graphic representation of an example user interface that includes a suggestion generated by a second application.

Turning to FIG. 4C, a graphic representation of an example conversation interface is illustrated that shows a suggestion generated by a promotion service. In the illustrated example, the conversation interface 1150 is displayed on Melissa's mobile screen. The conversation interface 1150 includes a suggestion 1152 "Dress Factory has 20% off for dress and jewelry until May 30." The promotion service generates suggestion 1152 based on the entities "Dress Factory" and "discount" identified by the messaging application 103 in FIG. 11A. In one example, the promotion service may perform a search for the entities on the Internet to generate the suggestion 1152. The suggestion generator 132 may receive the suggestion 1152 and then provide the suggestion 1152 to all participants of the conversation in FIG. 11A, e.g., Melissa G., Alice Z., Chris B. FIG. 11B displays the suggestion 1152 on a mobile screen of Melissa, identical to the suggestions shown to Alice or Chris.

Figure 4D:
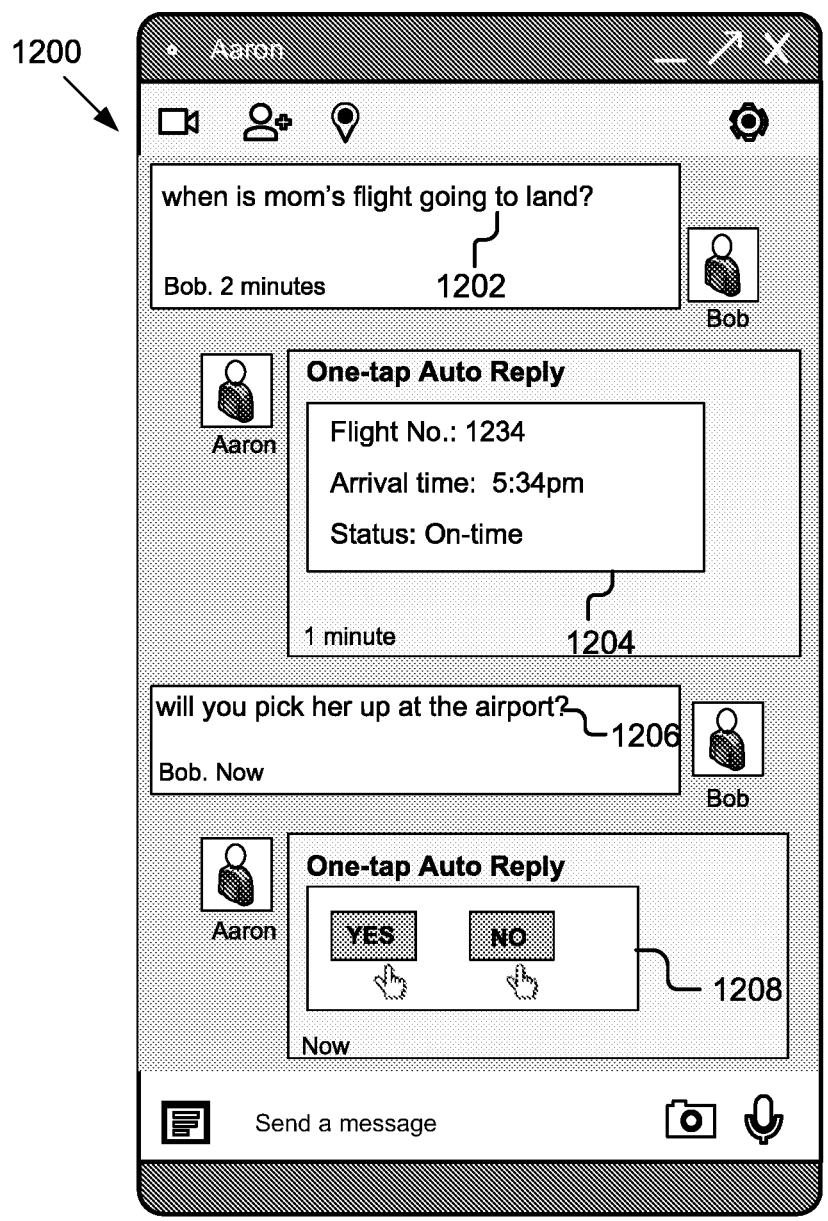
FIG. 4D is a graphic representation of an example user interface that includes options for a one-tap reply.

FIG. 4D is a graphic representation of an example conversation interface showing one-tap replies. In the illustrated FIG. 12, the conversation interface 1200 is displayed on Aaron's mobile screen. Responsive to receiving a question 1202 "when is mom's flight going to land?" from Bob, the messaging application 103 may predict a potential response from Aaron based on previous user actions of Aaron (e.g., a purchase history), and generates a one-tap reply 1204 for Aaron. The auto reply 1204 lists the flight number, the arrival time and a flight status. Aaron therefore saves time to type an answer to Bob. Similarly, when Bob sends another question 1206 "will you pick her up at the airport?," the messaging application 103 determines that this is a yes or no question, and generates a one-tap auto reply 1208 to include two options "YES" or "NO" for Aaron to choose.

Figure 4E:
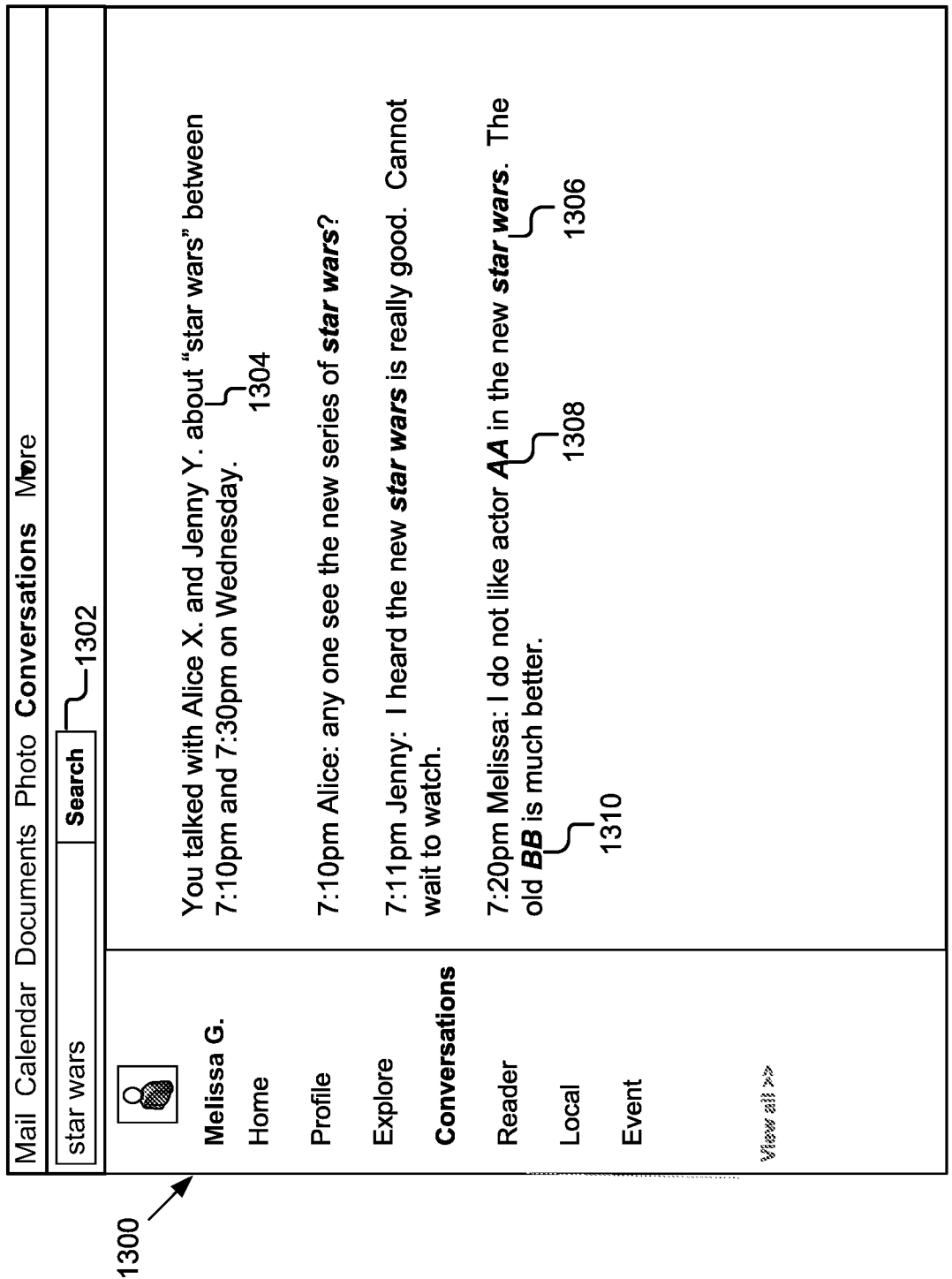
FIG. 4E is a graphic representation of an example user interface that includes a conversation summary.

FIG. 4E is a graphic representation of an example conversation interface showing a conversation report. The conversation interface 1300 includes a search box 1302, where the user can search for conversations based on participant name, topic, time, combinations thereof, etc. In the illustrated example in FIG. 13, the user searched for conversations about a movie "star wars." Responsive to the search request from the user, the messaging application 103 may generate a report. In certain examples, the report may start with a summary 1304 on when the user discussed the topic and the other participants in the conversations, e.g., that Mellissa, Alice and Jenny discussed "star wars" between 7:10-7:30 pm on Wednesday. The report may also include the conversation messages from each participant in a time order. The report may also highlight the keyword "star wars" 1306 searched by the user. In addition, the report may highlight certain entities (e.g., actors "AA" 1108 and "BB" 1310), to enable the user to retrieve more information (e.g., biography, photos) on the entities. Each highlighted and identified entity may be associated with a hyperlink that enables the user to perform a search for the entity on the Internet.

Figure 4F:
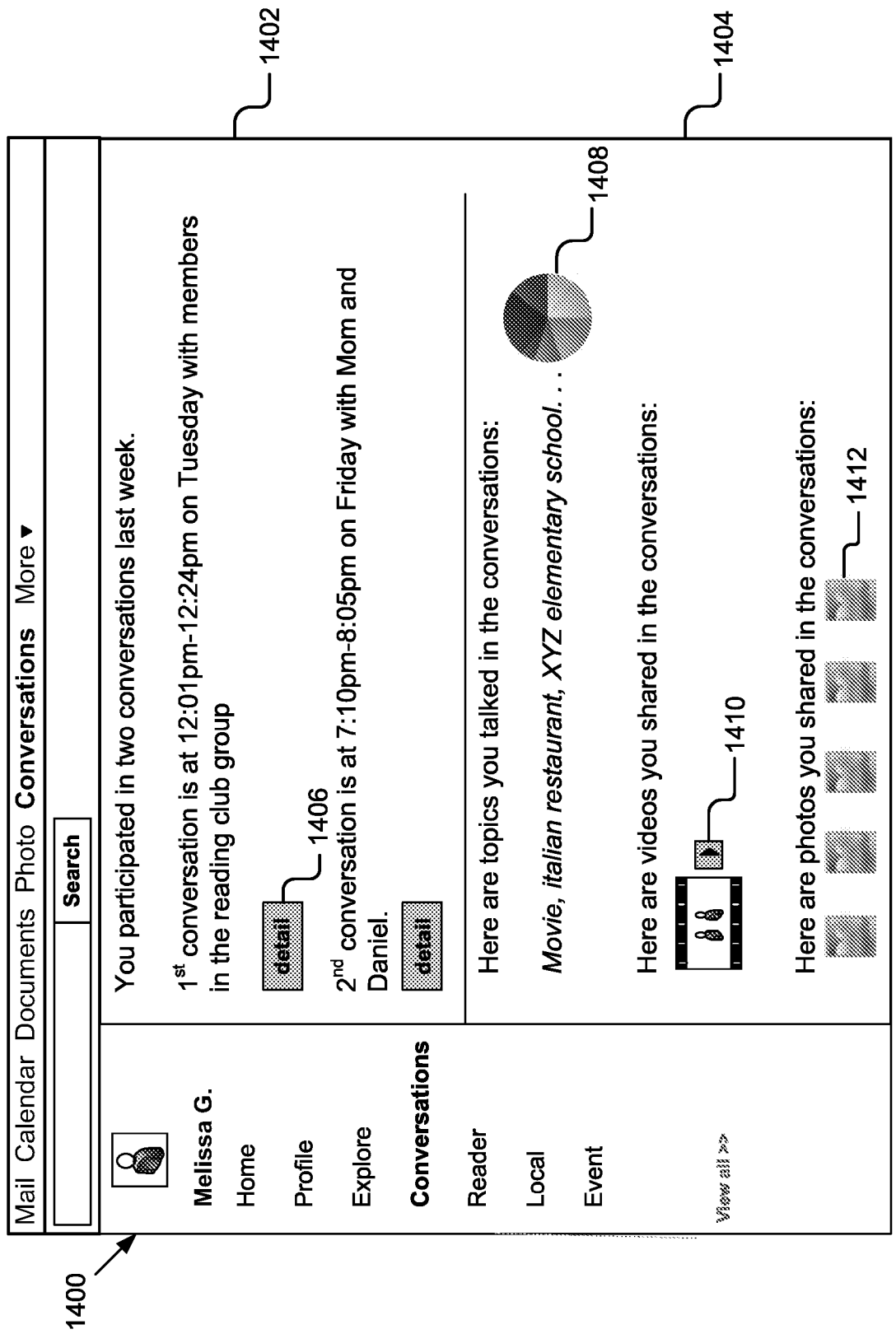
FIG. 4F is a graphic representation of an example user interface that includes a conversation summary.

FIG. 4F is a graphic representation of an example conversation interface showing a conversation summary. In the illustrated example, the conversation interface 1400 includes a conversation summary 1402 generated by the messaging application 103 for a user summarizing the conversations that the user participated in during a week. The conversation summary may include two exemplary portions 1402 and 1404. In the first portion 1402, the summary may include the number of conversations the user participated in during the past week, and some basic information on the conversations, e.g., time of day, date, identities of the other participants, and the like. The first portion 1402 may also include a detail option 1406 for each conversation that provides further details on each conversation including conversation messages from each participant, the time when each message was sent, etc. The second portion 1404 may include salient information on the conversations conducted in the past week including, for example, the topics discussed in the conversations (optionally, a pie chart 1408 describing the percentage of each topic in the conversations), audio/visual content shared in the conversations (optionally, a link 1410 to play the content), the photos 1412 shared in the two conversations.

Figure 4G:
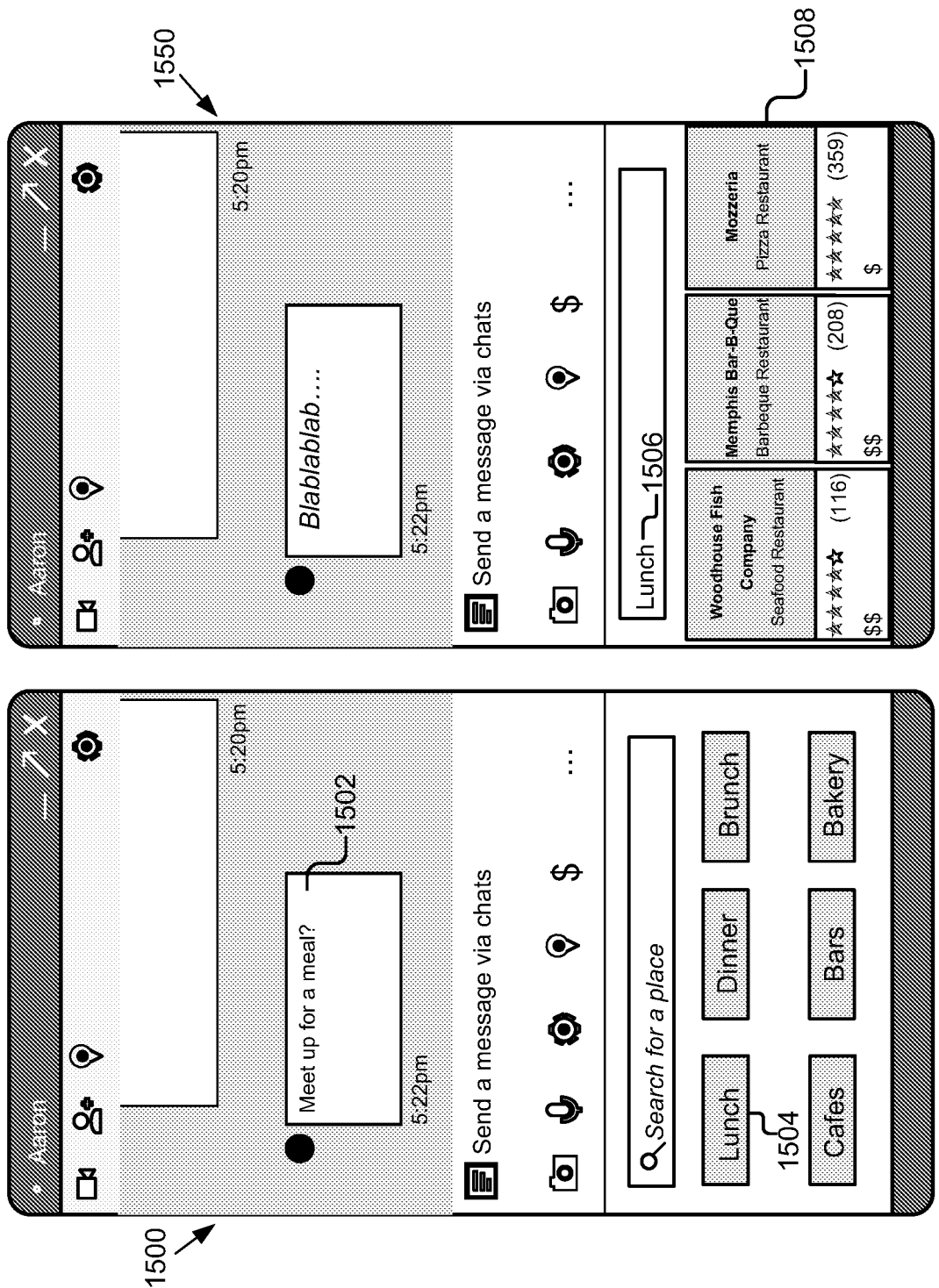
FIG. 4G is a graphic representation of example user interfaces that include different suggestions.

FIG. 4G includes graphic representations of example conversation interfaces showing serial presentation of suggestions. In the illustrated FIG. 4G, the conversation interface 1500 is displayed on a user's mobile screen. Responsive to receiving a message 1502 "meet up for a meal?," the messaging application 103 generates and displays options 1504 for "lunch," "dinner," "brunch," etc. The user may select one of the options 1504 first suggested to the user, which triggers a second suggestion to be generated. FIG. 4G displays a conversation interface 1550 generated responsive to receiving the user selection as shown in the option 1506. Upon the user's selection for lunch in the option 1506, the messaging application 103 generates and displays certain restaurants open for lunch. In certain implementations, the messaging application 103 may display only those restaurants that are within a certain distance range of all of the participants in the conversation. In some examples, the restaurant information 1508 may include a restaurant name, a restaurant type, a review and a price.

In certain implementations, the displayed restaurant information may be selectable and actionable. In one example, the user may select a particular restaurant and display it to the other participants in the conversation, e.g., as a message including the restaurant name, as a message including the restaurant name and prefilled default words suitable to the conversation (e.g., "let's meet at . . . "). In another example, the user may select a particular restaurant to perform a search for the restaurant on the Internet, retrieve merchant information from a website, retrieve a map of the restaurant location, and the like. The user may then choose to display the retrieved information to the other participants in the conversation, e.g., by inserting a map of the restaurant location into the conversation interface.

Example Overview—Suggested Responses for Messaging Conversations

Figure 5A:
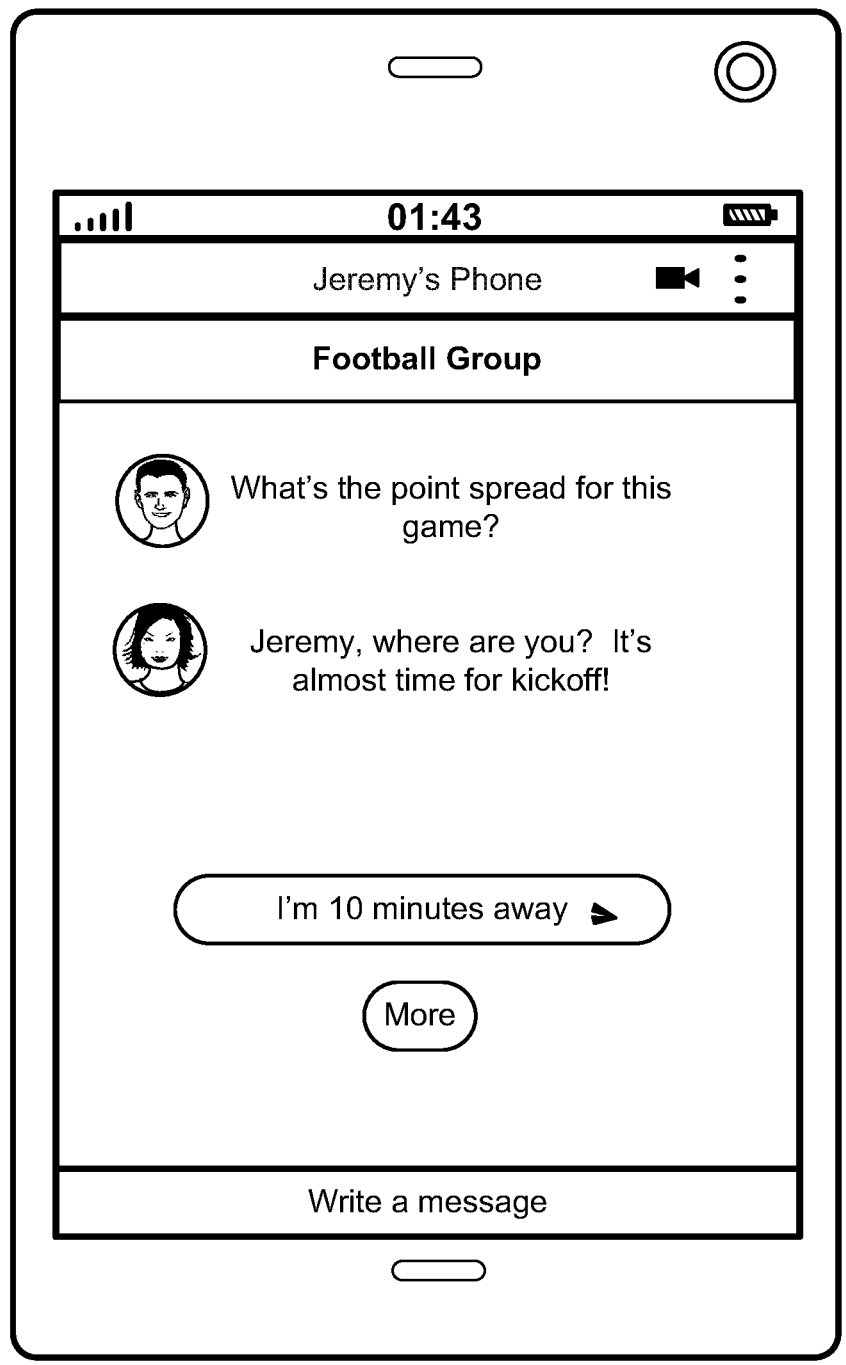
FIG. 5A is a graphic representation of an example user interface that includes a one-tap answer.

Turning now to FIG. 5A, a messaging application user interface is illustrated. In some implementations, a messaging application 103 receives a message between a first user and a group, where the group includes other users. For example, the group is a football group and the message is a first user asking a second user that is one of the other users how close the second user is to a location of a football game that the other users are at. A context of the message, the first user, and the other users is determined. The context may include an event or a holiday. In another example, the context is that the message is a request for an estimated time of arrival of the user.

A suggested response for each of the other users to share with the group based on the message and the context is determined. The suggested response may include an image to share with the group (e.g., taken from a second user's phone), a location to share with the group (e.g., based on the location of the second user), or a calendar event to share with the second user (e.g., based on the message mentioning attending the event).

In some implementations, the suggested response may be based on using machine learning to develop a personalized model for a second user. The messaging application 103 may generate a machine learning model and use the machine learning model to generate the suggested response by filtering examples from a corpus of messages or conversations, train a neural network to suggest responses based on the examples, and modify the suggested responses based on personalization of the suggested responses based on information associated with the second user. The machine learning model may incorporate additional services in the suggested responses. For example, the messaging application 103 may use the machine learning model to obtain location information about the user, photos associated with the user, purchasing information associated with the user, etc. If a first user asks a second user "How was your vacation?" the machine learning model may suggest that the second user attach photos from a vacation where the photos are retrieved from a photo server and identified as photos that were taken during the vacation and/or at the location of the vacation. If the first user provides a link to a baseball hat to the second user and asks the second user if she likes the baseball hat, the machine learning model may suggest that the second user response "I love it" based on a recent purchase of the baseball hat, a high rating of the baseball hat on a commerce website, etc. If the first user asks the second user "Where are you?" the machine learning model may suggest providing a map of the second user's location from a mapping application to the first user. The suggestion may be provided to the second user as a suggestion for including in a reply, that is a reply to the message "Where are you?". As a further example, assume a given user is composing and/or has sent a message of "I'm on my way". A location of the given user may be suggested to the given user for inclusion in the message (if composing) and/or for providing as an additional message (if sent).

In some implementations, the suggested response may be customized based on whether a chat bot is participating in messages associated with the group. For example, the messaging application 103 may determine whether the chat bot is present. Responsive to the chat bot being present, the messaging application 103 generates a first set of automatic suggested responses. For example, the first set of automatic suggested responses may be based on conversational rules followed by the chat bot. The conversational rules help create a format that is easily understood by the chat bots for ease of communication. Responsive to the chat bot being absent, the messaging application 103 generates a second set of automatic suggested responses. For example, the second set of automatic suggested responses may be based on user preferences. In some implementations, the messaging application 103 may provide an option to a user to switch to a bot mode, which changes the user's avatar to a bot and automatically replies to conversations using a highest ranked suggested response. In some implementations, the messaging application 103 may determine what conversations, messages, and senders are important to a user and the suggested response is modified accordingly.

The suggested response may be based on a personality of a second user. For example, the messaging application 103 may determine a personality of the second user based on punctuation use, emoji use, categorizing words in the message based on a whitelist as including humor or sarcasm, etc.

A notification may be generated with the suggested response for a second user of the other users that allows the second user to respond with a one-tap action. For example, the suggested response includes determining a distance between the second user and the location of the football game, an estimated travel time, and the suggested response written in the style preferred by the second user. The messaging application 103 may determine the estimated time of arrival for the second user based on a location of the second user, a calendar event that includes a location of the calendar event, and/or information about a destination from a mapping application. In some implementations, the message may include a request for information about a recent event. The messaging application 103 may determine the suggested response by determining an image that corresponds to the recent event and a social network post that relates to the recent event.

The suggested response may be based on sensor data, one or more preferences, a conversation history, or one or more recent activities performed by each of the other participants. Based on sensor data, it may be determined that the user is in transit and the one-tap action may be based on determining that the second user is in transit. For example, the user interface may include multiple suggested responses if a user is stationary but if the messaging application 103 determines that the user is driving, the messaging application 103 may suggest the one-tap action response.

In some implementations, the messaging application 103 determines a trending response based on other messages in a region, a market, or a country related to a location of a second user. For example, the messaging application 103 may determine trending responses during the presidential election, a response for a special occasion such as "Happy New Year!" or "Go Seahawks!" if the messaging application 103 determines that the Seahawks are trending and the second user is a fan of the Seahawks. The messaging application 103 may include the trending response as part of the suggested response.

In some implementations, the messaging application 103 provides a second user of the other users with a graphical user interface that includes an option to specify a type of personality and a level of the type of personality to be used for determining the suggested response. For example, the user interface may include a slider for specifying whether the suggested response should include an emoji.

In some implementations, the messaging application 103 determines a conversation starter suggestion. The messaging application 103 may provide the conversation starter suggestion based on a threshold time passing since a last message was received in a conversation. For example, the messaging application 103 may determine that it has been 24 hours since the last message was received in a conversation. As a result, the messaging application 103 may provide the conversation start suggestion to the last person to provide a message, the most frequent contributor to the conversation, a group leader, etc. The messaging application 103 may determine the content of the conversation starter suggestion based on a topic associated with the group, a trending topic (trading a popular baseball player), a recent event related to the topic associated with the group (a baseball team made the playoffs), an activity associated with one of the users (e.g., a vacation, a visit to a ballgame), etc.

Figure 5B:
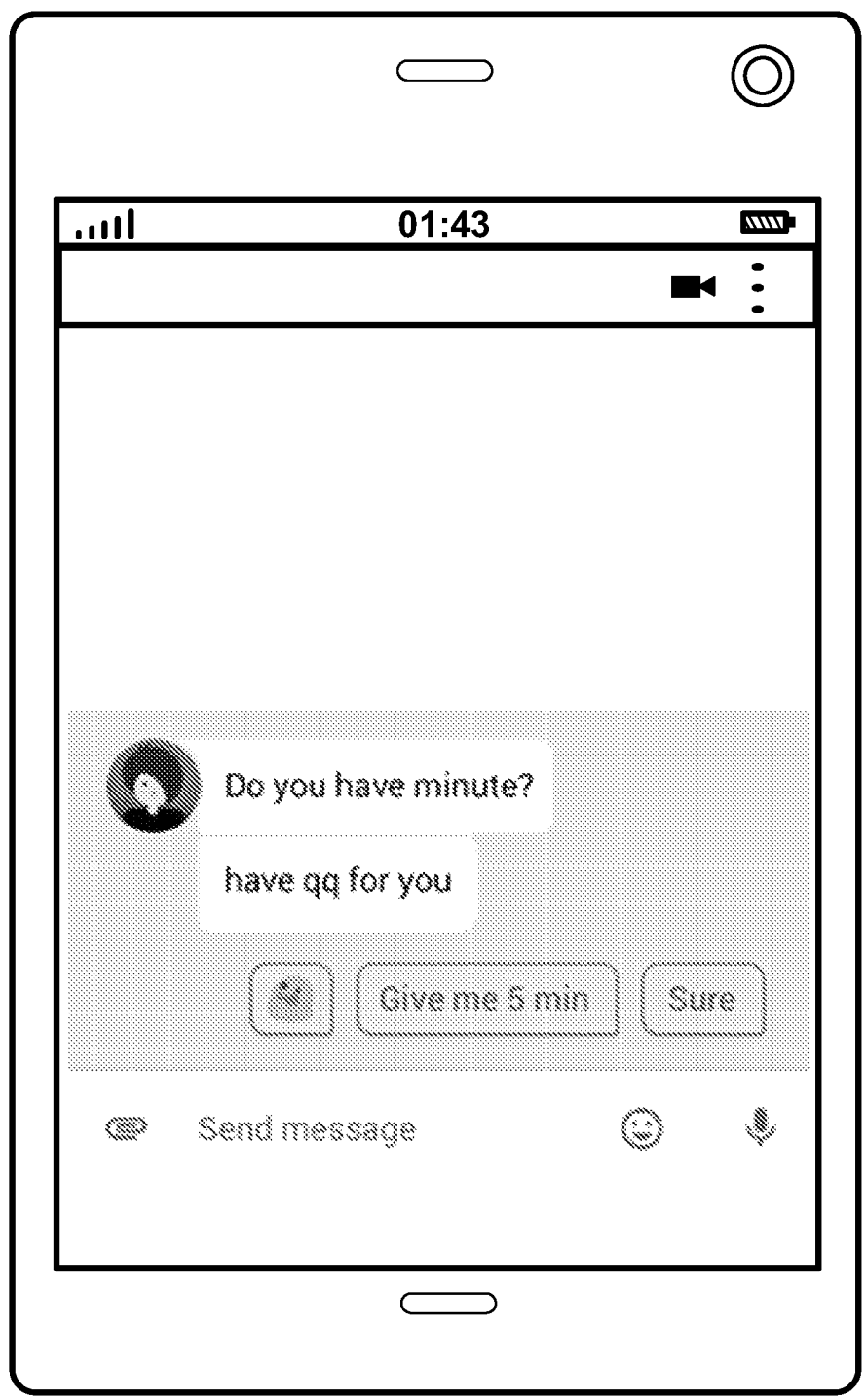
FIG. 5B is a graphic representation of an example set of suggested responses.

FIG. 5B is a graphic representation of an example set of suggested responses. In this example, in response to a question from a first user about whether the second user has a minute, the messaging application 103 may provide three suggested response that include an emoji, a time period for replying, and a simple affirmation. Below are examples of text suggestions organized according to the type of suggestion:

| Type | Message | Predicted Reply |
| --- | --- | --- |
| Raw Text | How are you? | I'm great, how are you? |
| Emoji | I got accepted! | Way to go 🎉! |
| Time | What time Wednesday works for you? | <Time (Wed)> would be perfect. |
| Location | Where are you? | <Location> |
| Person | Can you give me Susan's contact info? | Her number is <Phone Number> |
| Event | What are you up to this weekend? | I'm going to <Event>. |
| Business | Where do you want to eat? | How about <Business>? |
| Movie | Do you want to go see a movie? | <Movie> looks interesting. |

| Type | Suggested message examples | Features |
|---|---|---|
| Time | How about Wednesday at 7pm? | Calendar - display schedule/create event |
| Location | Pick me up from 1600 Amphitheatre. | Link to Maps |
| Person | Susan's number is 867-5309 | Add to Contacts |
| Product | I am thinking about buying the new iPad. | Link to product in |
| Event | I am going to outside lands this weekend. | Calendar - display schedule/create event |
| Business | Let's get a drink at sports page. | Display info from Maps/reviewing service |
| Movie | Do you want to go see Mission Impossible? | Display info from KG, link to website for buying tickets |

Figure 5C:
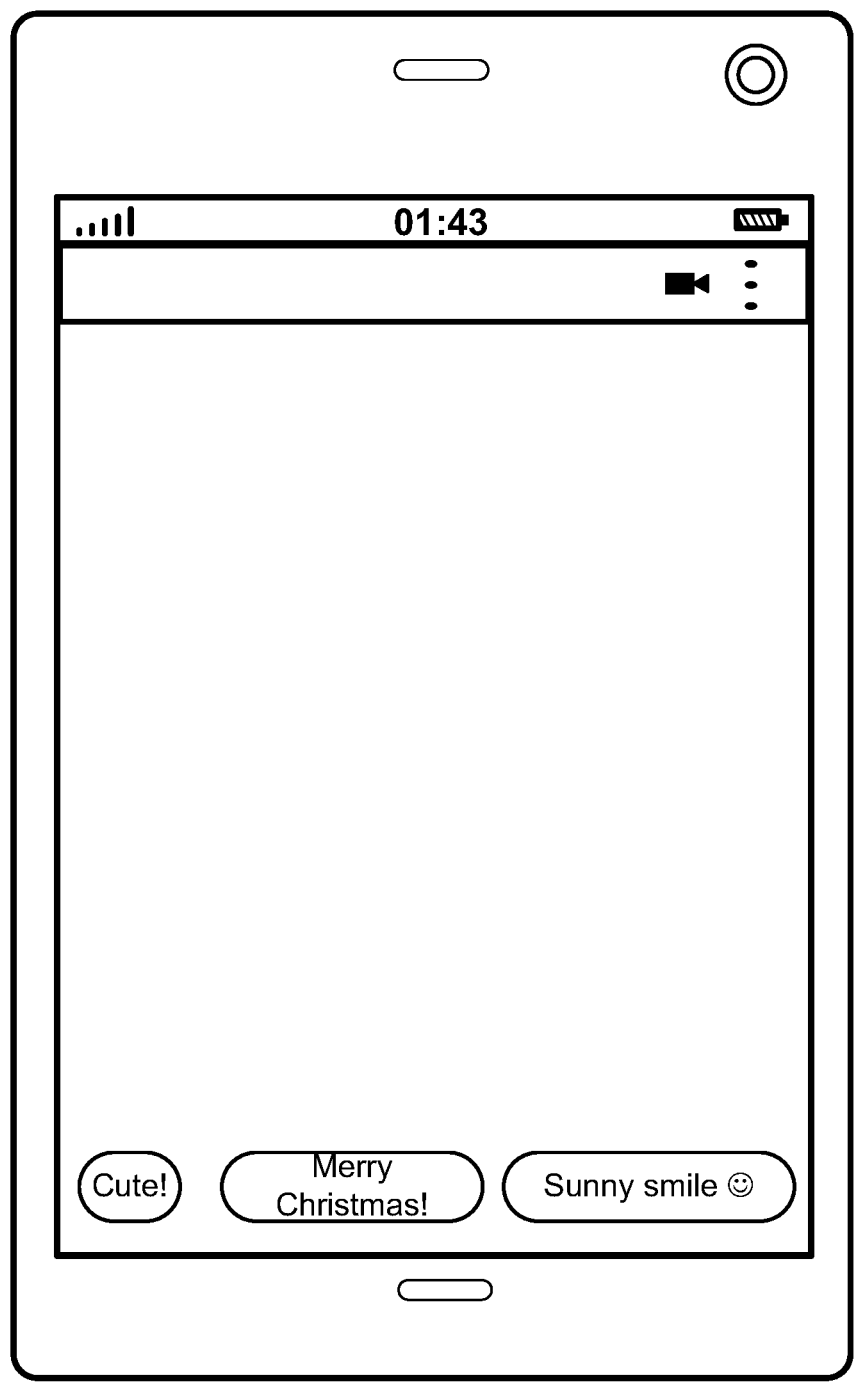
FIG. 5C illustrates a first user sending a second user a picture of the second user's baby.

In some implementations, the suggested response may pertain to media and not simply text. For example, FIG. 5C illustrates an example where a first user sends a second user a picture of the second user's baby. The picture is not illustrated in FIG. 5C for the sake of simplicity, but may be presented to the second user above the suggestions of FIG. 5C. The messaging application 103 provides suggestions based on performing analysis on the picture to identify that the picture includes a baby dressed in a Santa suit and that the suggested responses ("Cute!", "Merry Christmas!", and "Sunny smile") should include a reaction to the picture of the baby in the Santa suit. For example the picture may be applied as input to a neural network trained to predict objects in images, and output generated over the network that indicates a baby is present and a Santa suit is present. Suggestions "Cute!" and "Sunny smile" may be selected based on being suggested responses for "baby pictures" and "Merry Christmas!" selected based on being a suggested response for "Santa".

Figure 6:
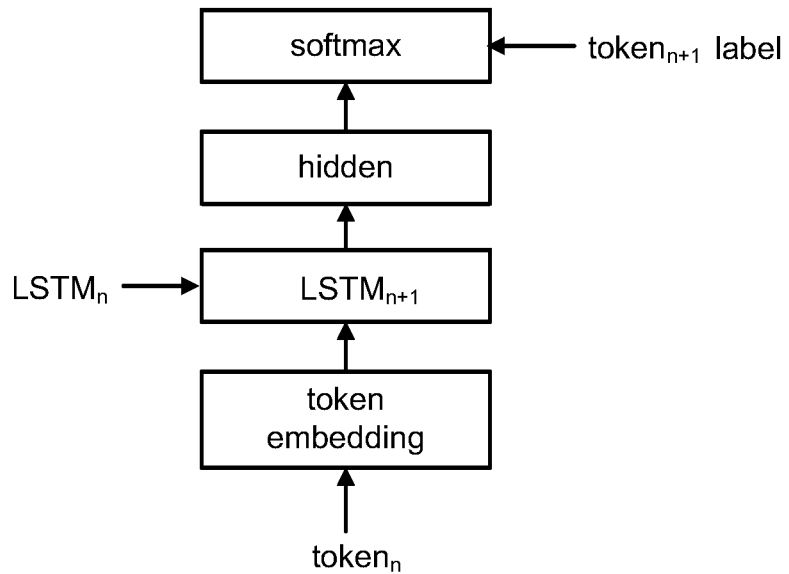
FIG. 6 illustrates a general LSTM model.

FIG. 6 illustrates a general LSTM model that includes the messaging application 103 receiving a token (e.g., a previous message) and a previous LSTM state. The messaging application 103 performs token embedding by tokenizing each message in a conversation, generates a modified LSTM model based on an original LSTM model, applies a hidden Markov model, and applies softmax to predict the next token (e.g., the suggested response) by, for example, mapping the LSTM's output to a probability distribution.

Figure 7:
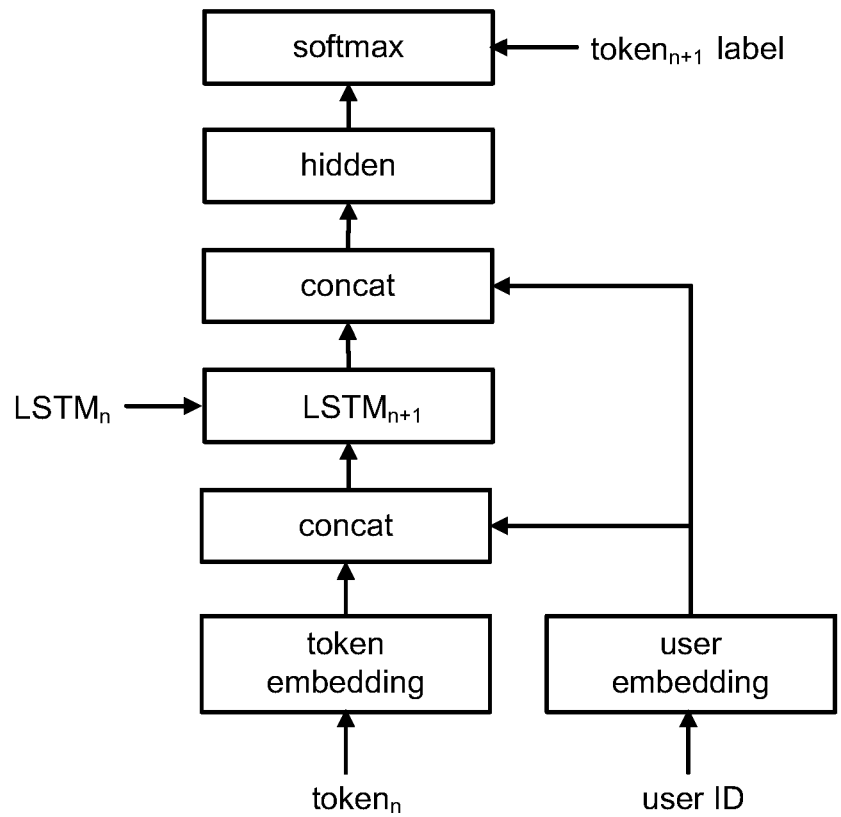
FIG. 7 illustrates a personalized LSTM model.

FIG. 7 illustrates a personalized LSTM model where the messaging application 103 receives a token and a user identifier, the token is embedded, the user identifier is embedded, and concatenation is performed. In some implementations, the tokens are lower-cased. The concatenation may include generating a count for each token, for a number of occurrences, and a number of unique users that have used the tokens. If a token has been associated with less than a predetermined number of unique users (e.g., 1000 unique users), the token is mapped to a throwaway database. A predetermined number of tokens that are ranked as exceeding a threshold ranking are mapped to a token vocabulary database and the rest are mapped to the throwaway database. The concatenation may also include generating counts for a number of total tokens used for each user. If a user is associated with a number of tokens that is greater than a predetermined token value (e.g., a minimum token count per user), the tokens are associated with a user vocabulary database and the rest are mapped to the throwaway database.

The messaging application 103 may generate a modified LSTM model based on an original LSTM model and performs concatenation. In some implementations, the messaging application 103 may consider messages independently (i.e., without context of their conversation). The messaging application 103 may discard messages authored by users that are in the throwaway database. For the rest of the messages, the messaging application 103 may sort the message by time, include the first 75% in a training set of data, and include the last 25% in a test set. In some implementations during a one-time step, 100 known whitelisted users may be selected by randomly selecting 10 users from each decile of users (ranked by a number of tokens). The train and test data for each of the users may be extracted into separate tables to experiment with personalized models. The messaging application 103 may perform a hidden Markov model and applies soft max to predict the next token.

Figures 8, 9:
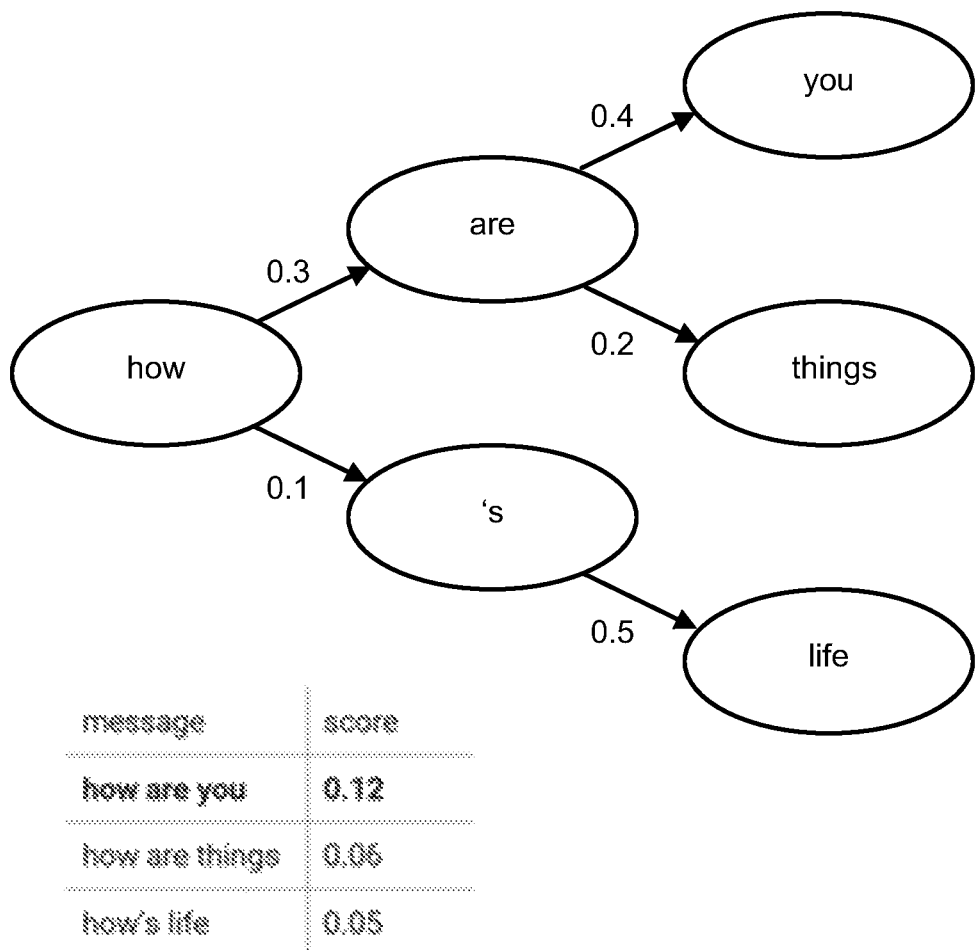
FIG. 8 illustrates an example token trie.
FIG. 9 illustrates example statistics associated with a number of messages as a function of a number of messages and a type of model

In some implementations, the messaging application 103 receives human-rated semantic clusters, applies a model that predicts a set of the most likely clusters that the predicted reply will belong to, and for each predicted cluster a suggested reply is predicted by the scoring model using a beam search over a token trie, such as the token trie illustrated in FIG. 8. In some implementations, the messaging application 103 uses a recall at three metric that describes given that a message is a reply in the whitelist, how often the model ranks the message within the top three. The recall at three metric may be exact if exactly the right message was predicted or cluster if the predicted message falls in the same semantic cluster as the right message. FIG. 9 illustrates statistics associated with a number of messages as a function of a number of messages and a type of model.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the implementations can be described above primarily with reference to user interfaces and particular hardware. However, the implementations can apply to any type of computing device that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions above are presented in terms of algorithms and symbolic representations of operations on data bits within a computer memory.

These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The implementations of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including floppy disks, optical disks, ROMs, CD-ROMs, magnetic disks, RAMs, EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations or some implementations containing both hardware and software elements. In some implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

In situations in which the systems discussed above collect personal information, the systems provide users with an opportunity to control whether programs or features collect user information (e.g., information about a user's social network, social actions or activities, profession, a user's preferences, or a user's current location), or control whether and/or how to receive content from the server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the server.

What is claimed is:

1. A computer-implemented method to automatically provide services in a messaging application, the method comprising:
   receiving one or more messages of a message exchange thread between multiple users in the messaging application, the one or more messages each being submitted by a corresponding one of the multiple users via the messaging application, and the multiple users including a first user and a second user;
   determining that the one or more messages include an actionable entity based on analyzing the one or more messages to determine contextual indicators in the one or more messages, the contextual indicators including a conversation flow, a message tense, a type of verb, and a first time at which the one or messages were sent, wherein the actionable entity is an action related to an entity selected from the group of person, place, object, and combinations thereof;
   providing an automatic response suggestion for the actionable entity based on the contextual indicators to the first user via a corresponding messaging application of the first user;
   providing a user interface, via the messaging application, that includes an option to search the one or more messages for a corresponding message based on a name;
   receiving a search request based on the name; and
   displaying, in the user interface, a particular message of the message exchange thread that includes at least a portion of the name, and wherein the name is associated with a hyperlink that, when selected, performs an internet search for the name.

2. The method of claim 1, further comprising determining a list of entities that the first user dislikes, wherein the automatic response suggestion excludes the entities from the list of entities from the automatic response suggestion.

3. The method of claim 1, wherein the automatic response suggestion includes at least one action selected from the group of providing flight information, determining an estimated time of arrival at a first location based on a second location of a device associated with the first user, and combinations thereof.

4. The method of claim 1, further comprising:
   identifying a topic from the one or more messages of the message exchange thread; and
   generating a summary of the one or more messages of the message exchange thread that includes a timestamp for each message that included the topic.

5. The method of claim 1, wherein providing the automatic response suggestion is further based on a purchase history associated with the first user.

6. The method of claim 4, wherein the user interface includes an additional option to search the summary for a corresponding message based on at least one selected from the group of a second time, a topic, and combinations thereof.

7. The method of claim 4 wherein the summary includes one or more photos that were shared in the one or more messages of the message exchange thread.

8. The method of claim 1, wherein the user interface includes an additional option to search the message exchange thread within a bounded time period.

9. The method of claim 1, wherein the automatic response suggestion includes an image from a device associated with the first user.

10. The method of claim 1, further comprising determining, based on sensor data from a user device of the first user, that the first user is in-transit, wherein the automatic response suggestion is further based on the first user being in-transit.

11. A non-transitory computer storage medium encoded with a computer program, the computer program comprising instructions that, when executed by one or more computers, cause the one or more computers to perform operations comprising:
   receiving one or more messages of a message exchange thread between multiple users in a messaging application, the one or more messages each being submitted by a corresponding one of the multiple users via the messaging application, and the multiple users including a first user and a second user;
   determining that the one or more messages include an actionable entity based on analyzing the one or more messages to determine contextual indicators in the one or more messages, the contextual indicators including a conversation flow, a message tense, a type of verb, and a time at which the one or messages were sent, wherein the actionable entity is an action related to an entity selected from the group of person, place, object, and combinations thereof;
   providing an automatic response suggestion for the actionable entity based on the contextual indicators to the first user via a corresponding messaging application of the first user;
   providing a user interface, via the messaging application, that includes an option to search the one or more messages for a corresponding message based on a name;
   receiving a search request based on the name; and
   displaying, in the user interface, a particular message of the message exchange thread that includes at least a portion of the name, and wherein the name is associated with a hyperlink that, when selected, performs an internet search for the name.

12. The non-transitory computer storage medium of claim 11, wherein the operations further comprise:
   determining that a threshold time has passed since a last message was received in the message exchange thread; and
   providing a conversation starter suggestion to the first user.

13. The non-transitory computer storage medium of claim 11, wherein the automatic response suggestion includes at least one action selected from the group of providing flight information, determining an estimated time of arrival at a first location based on a second location of a device associated with the first user, and combinations thereof.

14. The non-transitory computer storage medium of claim 11, wherein the operations further include:
   identifying a topic from the one or more messages of the message exchange thread; and
   generating a summary of the one or more messages of the message exchange thread that includes a timestamp for each message that included the topic.

15. The non-transitory computer storage medium of claim 11, wherein providing the automatic response suggestion is further based on a purchase history associated with the first user.

16. A system to automatically provide services in a messaging application, the system comprising:
   one or more processors coupled to a memory that stores executable code, the one or more processors operable to:
      receive one or more messages of a message exchange thread between multiple users in the messaging application, the one or more messages each being submitted by a corresponding one of the multiple users via the messaging application, and the multiple users including a first user and a second user;
      determine that the one or more messages include an actionable entity based on analyzing the one or more messages to determine contextual indicators in the one or more messages, the contextual indicators including a conversation flow, a message tense, a type of verb, and a time at which the one or messages were sent, wherein the actionable entity is an action related to an entity selected from the group of person, place, object, and combinations thereof;
      provide an automatic response suggestion for the actionable entity based on the contextual indicators to the first user via a corresponding messaging application of the first user;
      provide a user interface, via the messaging application, that includes an option to search the one or more messages for a corresponding message based on a name;
      receive a search request based on the name; and
      display, in the user interface, a particular message of the message exchange thread that includes at least a portion of the name, and wherein the name is associated with a hyperlink that, when selected, performs an internet search for the name.

17. The system of claim 16, wherein the processors are further operable to determine a list of entities that the first user dislikes, wherein the automatic response suggestion excludes the entities from the list of entities from the automatic response suggestion.

18. The system of claim 16, wherein the automatic response suggestion includes at least one action selected from the group of providing flight information, determining an estimated time of arrival at a first location based on a second location of a device associated with the first user, and combinations thereof.

19. The system of claim 16, wherein the processors are further operable to:
   identify a topic from the one or more messages of the message exchange thread; and
   generate a summary of the one or more messages of the message exchange thread that includes a timestamp for each message that included the topic.

20. The system of claim 16, wherein providing the automatic response suggestion is further based on a purchase history associated with the first user.

* * * * *